US011228959B2

(12) United States Patent
Li et al.

(10) Patent No.: US 11,228,959 B2
(45) Date of Patent: *Jan. 18, 2022

(54) AGGREGATED HANDOVER IN INTEGRATED SMALL CELL AND WIFI NETWORKS

(71) Applicant: Convida Wireless, LLC, Wilmington, DE (US)

(72) Inventors: Qing Li, Princeton Junction, NJ (US); Michael F. Starsinic, Newtown, PA (US); Ahmed Mohamed, Miramar, FL (US); Rocco Di Girolamo, Laval (CA)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,232

(22) Filed: Mar. 11, 2020

(65) Prior Publication Data

US 2020/0213928 A1 Jul. 2, 2020

Related U.S. Application Data

(63) Continuation of application No. 15/762,576, filed as application No. PCT/US2016/053362 on Sep. 23, 2016, now Pat. No. 10,624,016.

(Continued)

(51) Int. Cl.
*H04W 36/00* (2009.01)
*H04W 36/36* (2009.01)
(Continued)

(52) U.S. Cl.
CPC ........... *H04W 36/36* (2013.01); *H04W 8/186* (2013.01); *H04W 36/0009* (2018.08);
(Continued)

(58) Field of Classification Search
CPC ..... H04W 36/36; H04W 36/14; H04W 84/12; H04W 8/18; H04W 36/00; H04W 36/08; H04W 8/186
See application file for complete search history.

(56) References Cited

U.S. PATENT DOCUMENTS 8,228,861 B1 7/2012 Nix
2009/0290554 A1* 11/2009 Siltala ............... H04W 36/0066
370/331

(Continued)

FOREIGN PATENT DOCUMENTS

| EP | 1401229 A1 | 3/2004 |
| WO | 2012/134116 A2 | 10/2012 |
| WO | 2014/053183 A1 | 4/2014 |

OTHER PUBLICATIONS

3GPP TR 23.852 V2.0.0, "3rd Generation Partnership Project; Technical Specification Group Services and System Aspects; Study on S2a Mobility based on GTP and WLAN access to EPC (SaMOG); Stage 2 (Release 12)", Sep. 2013, 156 pages.

(Continued)

Primary Examiner — Chi Ho A Lee
(74) Attorney, Agent, or Firm — BakerHostetler

(57) ABSTRACT

Mechanisms for efficient inter-system or inter-RAT handover for the case when large numbers of devices need to perform a handover within a short time interval or even simultaneously are described. These mechanisms can include an aggregated Handover Procedure. An Aggregated Handover procedure can be enabled by a UE and can be indicated to the network entities by "Aggregated Handover Indication". The detection of target (H)eNB or WLAN can be triggered by user, GPS location, boarding time, or a travel or eTicket application etc. The UEs requesting Aggregated (Continued)

Handover within a time interval, i.e. Handover Window, can be processed with aggregated messages by the core network entities.

18 Claims, 27 Drawing Sheets

Related U.S. Application Data

(60) Provisional application No. 62/222,391, filed on Sep. 23, 2015.

(51) Int. Cl.
| | |
|---|---|
| *H04W 8/18* | (2009.01) |
| *H04W 36/08* | (2009.01) |
| *H04W 36/14* | (2009.01) |
| *H04W 84/00* | (2009.01) |
| *H04W 84/12* | (2009.01) |

(52) U.S. Cl.
CPC ........... *H04W 36/08* (2013.01); *H04W 36/14* (2013.01); *H04W 84/005* (2013.01); *H04W 84/12* (2013.01)

(56) References Cited

U.S. PATENT DOCUMENTS

| | | | |
|---|---|---|---|
| 2009/0325578 A1 | 12/2009 | Li et al. | |
| 2010/0130212 A1 | 5/2010 | So et al. | |
| 2011/0044284 A1 | 2/2011 | Voltolina et al. | |
| 2011/0111753 A1 | 5/2011 | Vainikka et al. | |
| 2011/0305220 A1 | 12/2011 | Lindoff et al. | |
| 2012/0030739 A1 | 2/2012 | Vadapalli et al. | |
| 2012/0100852 A1 | 4/2012 | Horn | |
| 2013/0102312 A1* | 4/2013 | Nilsson | H04W 36/00 455/436 |
| 2013/0208584 A1 | 8/2013 | Kim et al. | |
| 2013/0223403 A1 | 8/2013 | Chen et al. | |
| 2013/0322325 A1* | 12/2013 | Hahn | H04W 36/0058 370/315 |
| 2014/0135008 A1* | 5/2014 | Yu | H04W 36/08 455/436 |
| 2015/0181481 A1* | 6/2015 | Masini | H04W 36/0083 455/436 |
| 2015/0245255 A1 | 8/2015 | Van et al. | |
| 2015/0304933 A1* | 10/2015 | Sachs | H04W 72/0453 455/440 |
| 2015/0382252 A1* | 12/2015 | Yu | H04W 36/0027 370/331 |
| 2016/0047884 A1* | 2/2016 | Zhang | G01S 5/0284 342/458 |
| 2016/0205600 A1* | 7/2016 | Xu | H04W 36/36 455/437 |
| 2017/0048763 A1 | 2/2017 | Ke et al. | |
| 2017/0054465 A1 | 2/2017 | Tesanovic et al. | |
| 2017/0251445 A1* | 8/2017 | Du | H04W 48/10 |
| 2018/0070268 A1* | 3/2018 | Iwai | H04W 28/22 |
| 2018/0242226 A1 | 8/2018 | He et al. | |

OTHER PUBLICATIONS

3GPP TS 22.234 V12.0.0, "3rd Generation Partnership Project; Technical Specification Group Services and System Aspects; Requirements on 3GPP System to Wireless Local Area Network (WLAN) Interworking (Release 12)", Sep. 2014, 16 pages.

3GPP TS 23.234 V12.0.0, "3rd Generation Partnership Project; Technical Specification group Services and System Aspects; 3GPP to Wireless Local Area Network (WLAN) Interworking; System Description (Release 12)", Sep. 2014, 84 pages.

3GPP TS 23.401 V13.4.0, "3rd Generation Partnership Project; Technical Specification Group Services and System Aspects; General Packet Radio Service (GPRS) Enhancements for Evolved Universal Terrestrial Radio Access Network (E-UTRAN) Access (Release 13)", Sep. 2015, 334 pages.

3GPP TS 23.402 V13.3.0, "3rd Generation Partnership Project; Technical Specification Group Services and System Aspects; Architecture Enhancements for Non-3GPP Accesses (Release 13)", Sep. 2015, 298 pages.

3GPP TS 29.273 V13.1.0, "3rd Generation Partnership Project; Technical Specification Group core Network and Terminals; Evolved Packet System (EPS); 3GPP EPS AAA Interfaces (Release 13)", Sep. 2015, 165 pages.

3GPP TS 29.274 V13.3.0, "3rd Generation Partnership Project; Technical Specification Group Core Network and Terminals; 3GPP Evolved Packet System (EPS); Evolved General Packet Radio Service (GPRS) Tunnelling Protocol for Control Plane (GTPv2-C); Stage 3 (Release 13)", Sep. 2015, 326 pages.

3GPP TS 29.275 V13.3.0, "3rd Generation Partnership Project; Technical Specification group Core Network and Terminals; Proxy Mobile IPv6 (PMIPv6) Based Mobility and Tunnelling Protocols; Stage 3 (Release 13)", Sep. 2015), 102 pages.

3GPP TS 29.281 V13.0.0, "3rd Generation Partnership Project; Technical Specification Group Core Network and Terminals; General Packet Radio system (GPRS) Tunnelling Protocol User Plane (GTPv1-U) (Release 13)", Sep. 2015, 28 pages.

Aboba et al., Network Working Group RFC: 3748, "Extensible Authentication Protocol (EAP)" Jun. 2004, 67 pages.

Droms et al., Network Working Group RFC: 3736, "Stateless Dynamic Host Configuralion Protocol (DHCP) Service for IPv6", Apr. 2004, 9 pages.

Gundavelli et al., Network Working Group RFC: 5213, "Proxy Mobile IPv6", Aug. 2008, 92 pages.

IEEE Std 802.11-2012, IEEE Standards Association, IEEE Standard for Information Technology—Telecommunications and Information Exchange Between Systems Local and Metropolitan Area Networks—Specific Requirements, "Part 11: Wireless LAN Medium Access Conlrol (MAC) and Physical Layer (PHY) Specifications", Mar. 29, 2012, 196 pages.

Thomson et al., Network Working Group, RFC: 4862, "IPv6 Stateless Address Autoconfiguralion", Sep. 2007, 30 pages.

\* cited by examiner

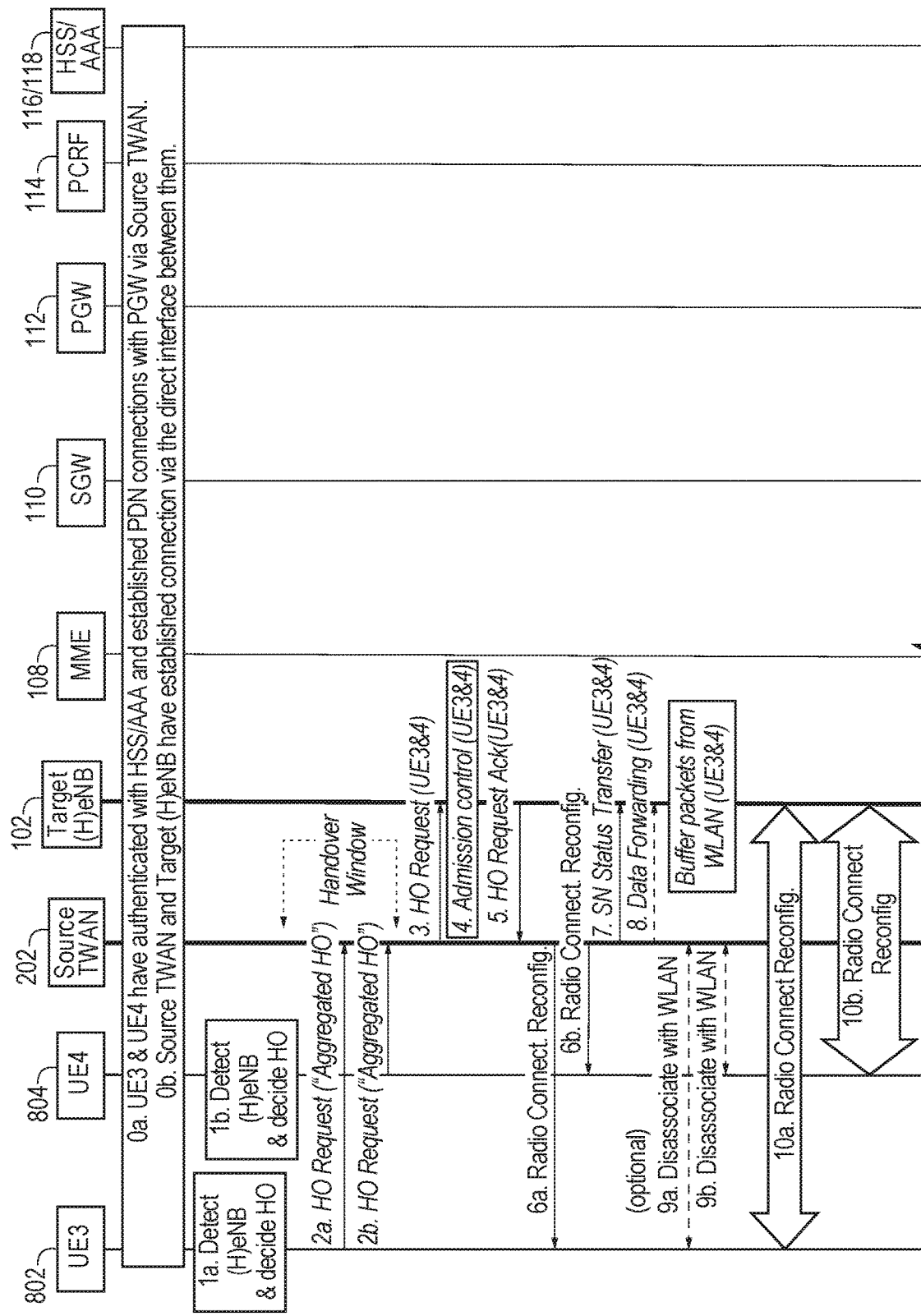

AGGREGATED HANDOVER IN INTEGRATED SMALL CELL AND WIFI NETWORKS

CROSS-REFERENCE TO RELATED APPLICATIONS

This Application is a continuation of U.S. patent application Ser. No. 15/762,576 filed Mar. 23, 2018 which is the National Stage Application filed under 35 U.S.C. § 371 of International Application No. PCT/US2016/053362 filed Sep. 23, 2016, which claims the benefit of U.S. Provisional Patent Application No. 62/222,391 filed Sep. 23, 2015, the disclosures of which are hereby incorporated by reference as if set forth in their entireties.

BACKGROUND

Today, Mobile Network Operators (MNOs) typically employ WiFi only for offloading "best effort" Internet traffic from their cellular and core networks. However, increased interest in operator deployment of "small cells" and "Carrier WiFi" will encourage Mobile Network Operators (MNOs) to seek new standard/vendor solutions for better interoperability between local cellular and WiFi networks enabling more control over their subscribers' Quality of Experience (QoE).

Specifically, as operators adopt "Carrier WiFi" to optimize their networks and reduce Capital Expense (CapEx)/Operating Expense (OpEx) we expect greater deployment of "Trusted" WLAN Access Networks (TWAN 102) that can directly interface with an operator's Mobile Core Network (MCN). We also expect greater integration of MNO deployed small cell and WiFi access networks within common geographical areas such as high-traffic urban metropolitan hotspot locations.

The GPRS Tunneling Protocol (GTP) [GPRS standing for General Packet Radio Service] has been the standard protocol for packet data transport in 3rd Generation Partnership Project (3GPP) networks. In terms of inter-working with different types of non-3GPP networks (e.g., Wireless Local Area Networks (WLAN), Worldwide Interoperability for Microwave Access (WiMAX), CDMA2000), the Internet Engineering Task Force (IETF) Proxy Mobile IP (PMIP) protocol has also been standardized as a general solution. However, for WLAN access networks in particular, 3GPP has also standardized use of their native GTP protocol as described below.

The 3GPP Release 11 SA2 work item for "S2a Mobility based on GTP & WLAN access to EPC 106" (SaMOG) focused on enabling a GTP-based S2a interface for "Trusted WLAN Access Networks" (TWANs) 102 toward the PDN Gateway (PGW) 112. The Release 11 scope precluded any solutions that would impact the UE and the overall results were captured in TR 23.852. The Release 11 architectures, functional descriptions and procedures were subsequently standardized in section 16 of TS 23.402. The applicable GTP control plane protocol for tunnel management (GTPv2-C) is specified in TS 29.274, and the GTP user plane protocol (GTP-U) is specified in TS 29.281. SaMOG has been extended as a Release 12 work item to address several Release 11 limitations and will include TWAN 102 solutions for UE-initiated PDN connectivity, multi-PDN connectivity, and seamless inter-system handover.

3GPP Release 10 standardized a GTP-based S2b interface for Untrusted WLAN access to the EPC 106. Section 7 of TS 23.402 includes the associated support for a GTP-based S2b interface between an evolved Packet Data Gateway (ePDG) and the PGW 112. Untrusted WLAN solutions require UE support for IPSec as well as EPC 106 deployment of an ePDG for establishing IPSec security associations with each UE.

3GPP Release 6 provided a standardized WLAN Interworking (I-WLAN) solution by introducing a Packet Data Gateway (PDG) for WLAN access to the "pre-EPC" packet-switched core network. The standard architectures and procedures were captured in TS 22.234. Annex F of TS 23.234, also described how to re-use existing GGSN deployments to implement the PDG functionality using a subset of the Gn interface (denoted as Gn') via a "Tunnel Termination Gateway" (TTG) using GTP towards the GGSN. Again, these solutions require UE support for IPSec as well as PDG/TTG support for establishing an IPSec tunnel with each UE.

The current architecture for non-roaming Trusted WLAN 102 and 3GPP LTE 104 access to EPC 106 is shown in FIG. 1.

Per section 16.1.1 of TS 23.402, when the WLAN is considered trusted by the operator, the Trusted WLAN Access Network (TWAN) 102 can be connected to the Evolved Packet Core (EPC) 106 via the STa interface toward the 3GPP AAA server/Proxy 118, and via the S2a interface toward the PDN Gateway (PGW) 112.

Comparing this to 3GPP LTE access, the LTE access network 104 (i.e. eNB or HeNB) is connected to the EPC 106 via the S1-MME interface toward the Mobility Management Entity (MME) 108, via the S1-U interface toward the Serving Gateway (SGW) 110, and indirectly via the S5 interface towards the PDN Gateway (PGW) 112.

An optional "Local Gateway" function (L-GW) 120 is also shown for small cell local IP access. We also show an optional HeNB Gateway (HeNB GW) 130 that may be used to concentrate the control plane signaling for multiple HeNBs toward the MME 108 and could also be used to handle HeNB user plane traffic toward the SGW 110. Finally, we show an optional Security Gateway (SeGW) 122 that may be used to provide secure access from the 3GPP LTE access network 104 (e.g. via HeNBs) to the EPC 106, i.e. via IPSec tunneling.

3GPP refers to an LTE femtocell as a Home eNodeB (HeNB). The HeNB is a type of cellular base station that is designed as "plug-and-play" customer premises equipment (CPE) that can be installed in residential and enterprise environments without the need for an experienced technician. HeNBs may also be deployed in public venues including hotspot locations. HeNBs use a broadband Internet connection to access a remote HeNB Management System (HeMS) for automatic configuration, while also providing backhaul access the EPC 106 network for cellular packet data services.

HeNBs operate in either closed, open or hybrid modes. Closed HeNBs only allow access to UEs that are part of an associated Closed Subscriber Group (CSG). Open HeNBs allow access to all subscribers. Hybrid HeNBs provide preferential treatment for associated CSG subscribers, while also allowing access to other subscribers based on resource availability (possibly with reduced QoS).

TS 23.402 considers the detailed functional split within a Trusted WLAN Access Network (TWAN) 102 as out of scope for 3GPP. Only the external behavior exposed by the SWw, S2a, and STa interfaces are in scope. Nevertheless, 3GPP did assume a reference TWAN 102 architecture for describing standard R11/R12 procedures related to S2a mobility over GTP (SaMOG). The architecture only describes the functional entities terminating each external interface and does not necessarily describe the processing between functional entities within the TWAN 102. The functions assumed to exist within the TWAN 102 are as described below.

WLAN Access Network (WLAN AN) includes of one or more WLAN Access Points (APs). An AP terminates the UE's WLAN IEEE 802.11 link via the SWw interface. The APs may be deployed as standalone APs or as "thin" APs connected to a Wireless LAN Controller (WLC), e.g., using the IETF CAPWAP protocols.

Trusted WLAN Access Gateway (TWAG) 124 terminates the GTP-based S2a interface with the PGW 112 and may act as the default IP router for the UE 105 on its WLAN access link. It also may act as a DHCP server for the UE. The TWAG 124 typically maintains UE 105 and AP MAC address associations for forwarding packets between the UE 105 (via the WLAN AP) and the associated S2a GTP-U tunnel (via the PGW 112).

Trusted WLAN AAA Proxy (TWAP) 126 terminates the Diameter-based STa interface with the 3GPP AAA server 118. It relays the AAA information between the WLAN AN and the 3GPP AAA server (or Proxy in case of roaming) 118. It can inform the TWAG 124 of layer 2 attach and detach events. It establishes the binding of UE subscription data with UE MAC address and can provide such information to the TWAG 124.

TWAN 102 can provide Authentication and Security. It is assumed that the UE can leverage USIM features for both 3GPP (LTE) and non-3GPP (WLAN) access. From Section 4.9.1 of TS 23.402:

"Non-3GPP access authentication [e.g., via WLAN] defines the process that is used for Access Control, i.e., to permit or deny a subscriber to attach to and use the resources of a non-3GPP IP access which is interworked with the EPC network. Non-3GPP access authentication signaling is executed between the UE and the 3GPP AAA server/HSS.

Trusted 3GPP-based access authentication is executed across an STa reference point. The 3GPP based access authentication signaling shall be based on IETF protocols, e.g., Extensible Authentication Protocol (EAP) as specified in RFC 3748."

The STa interface and Diameter application are used for authenticating and authorizing the UE 105 for EPC 106 access via trusted non-3GPP accesses. 3GPP TS 29.273 0 describes the standard TWAN 102 procedures currently supported on the STa interface.

TWAN 102 can provide IP Address Allocation. For EPC 106 access via GTP-based TWAN 102, the IPv4 address and/or IPv6 prefix is allocated to the UE 105 when a new Packet Data Network (PDN) connection is established with the EPC 106 over TWAN 102. A separate IP address may also be allocated by the TWAN 102 for local network traffic and/or direct Internet offload.

For PDN connectivity through EPC 106 via TWAN 102, the TWAN 102 receives the relevant PDN information via EAP/Diameter or WLCP signaling. The TWAN 102 may then request a routable IPv4 address for the UE 105 from the PGW 112 via the GTP Create Session Request. The IPv4 address is then delivered to the TWAN 102 during the GTP tunnel establishment via the GTP Create Session Response. If the UE 105 requests an IPv4 address for PDN connectivity via DHCPv4, the TWAN 102 delivers the received IPv4 address to the UE 105 within DHCPv4 signaling. Corresponding procedures are also defined for IPv6.

For 3GPP LTE access, the UE 107 automatically triggers a default PDN connection as part of its initial attachment to the EPC 106 network. It may also subsequently establish additional PDN connections as needed.

The primary purpose of the Attach procedure is for the UE 107 to register with the network in order to receive services for which it has subscribed to. The Attach procedure confirms the user's identity, identifies the services it is allowed to receive, establishes the security parameters (e.g., for data encryption), and notifies the network of the UE's initial location (e.g., in case it needs to be paged). Also, to support the "always-on" network connectivity expected by today's users, the LTE standards specify establishment of a default PDN connection as part of the Attach procedure. The radio resources for this default connection may be released during periods of inactivity, however the rest of the connection remains intact and the end-to-end connection can be quickly re-established by reassigning the radio resources in response to UE service requests.

When a UE 107 attempts to attach to the EPC 106 via an (H)eNB, it first establishes a Radio Resource Control (RRC) connection with the (H)eNB and encapsulates the Attach Request within the RRC signaling. The (H)eNB then selects an MME 108 and forwards the Attach Request within S1-AP signaling on the S1-MME interface. The MME 108 retrieves subscription information from the HSS 116 via the S6a interface in order to authenticate the UE 107 and allow attachment to the EPC 106.

After successfully authenticating the UE 107, the MME 108 selects an SGW 110 (e.g., based on proximity to the (H)eNB), and also selects a PGW 112, e.g., based on the default Access Point Name (APN) retrieved from HSS 116 or a specific APN requested by UE. The MME 108 communicates with the SGW 110 over the S11 interface to request creation of the PDN connection. The SGW 110 then executes the signaling to establish a GTP user plane tunnel with the designated PGW 112 over the S5 interface.

"GTP control" signaling also takes place indirectly within the S1-AP protocol between the MME 108 and (H)eNB. This ultimately leads to the establishment of a GTP user plane tunnel on the S1-U interface between (H)eNB and SGW 110.

The end-to-end path for the PDN connection between the UE 107 and PGW 112 is thus completed through the (H)eNB and SGW 110.

For non-3GPP TWAN 102 access, UE authentication and service authorization is accomplished via Extensible Authentication Protocol (EAP) signaling between the UE and 3GPP AAA server 118.

The PDN connectivity service is subsequently provided by the point-to-point connectivity between the UE 105 and the TWAN 102, concatenated with S2a bearer(s) between the TWAN 102 and the PGW 112. Unlike the LTE model, the WLAN radio resources are "always-on" from an EPC 106 perspective, e.g. any power-saving optimizations are handled transparently using IEEE 802.11 procedures within the WLAN.

When a UE 105 attempts to connect to the EPC 106 via a TWAN 102, it first establishes a Layer 2 connection with the WLAN and encapsulates EAP messages within EAP over LAN (EAPoL) signaling. The WLAN forwards the EAP messages to a TWAP 126 that then encapsulates them within Diameter signaling towards the 3GPP AAA server 118 via the STa interface. The 3GPP AAA server 118 retrieves subscription information from the HSS 116 via the SWx interface in order to authenticate the UE 105 and allow attachment to the EPC 106.

Beginning with 3GPP Release 11, the 3GPP AAA server 118 is able to provide the TWAN 102 with information via STa for establishing a PDN connection to the default PDN provisioned in the HSS 116. The TWAN 102 then exercises GTP control plane (GTPv2-C) and user plane (GTP-U) protocols over the S2a interface directly toward the PGW 112, thereby completing the PDN connection between the UE 105 and PGW 112 through the TWAN 102.

For 3GPP Release 12, the SaMOG phase-2 work item defined additional procedures for UE-initiated PDN connectivity, multi-PDN connectivity, and seamless inter-system handover.

For the case of single-PDN capable TWAN 102 scenarios, EAP extensions are defined to also support UE-initiated PDN requests and seamless inter-system handover requests.

For the case of multi-PDN capable TWAN 102 scenarios, a new WLAN Control Protocol (WLCP) has been defined between the UE and TWAN 102 to enable one or more UE PDN connection requests and seamless handover procedures. Note however, that a separate EAP procedure is still utilized between the UE and 3GPP AAA server 118 for UE authentication.

The Internet of Things (IoT) is the interconnection of uniquely identifiable objects within the existing Internet. IoT is envisioned to offer advanced connectivity of devices, systems, and services with many different protocols, domains, and applications.

Things or objects in the IoT include a large variety of devices such as heart monitoring implants, biochip transponders, automobile built-in sensors, temperature sensors, security monitors, and field operation devices. It's estimated that more than 30 billion devices will be wirelessly connected to the IoT (or Internet of Everything) by 2020, and that IoT or Cloud of Things, such as embedded and wearable devices, will have widespread and beneficial effects by 2025.

Directly connected to the Internet, most of the devices comprising IoT services will need to operate by utilizing standardized technologies. Standardization bodies, such as the IETF and ETSI, are working on developing protocols, systems, architectures and service frameworks to enable the IoT. A newly formed standard body oneM2M has been focusing on M2M/IoT service layer standardization for supporting End-to-End (E2E) M2M/IoT Services.

3GPP is designing a 5G network and is considering to incorporate the network slicing technology, which is a good fit for the 5G network. Because the 5G use cases (e.g., massive IoT, critical communications, and enhanced mobile broadband) demand very diverse and sometimes extreme requirements. The current architecture utilizes a relatively monolithic network and transport framework to accommodate a variety of services such as mobile traffic from smart phones, OTT content, feature phones, data cards, and embedded M2M devices. It is anticipated that the current architecture is not flexible and scalable enough to efficiently support a wider range of business need when each has its own specific set of performance, scalability and availability requirements. Furthermore, introduction of new network services should be made more efficient. Nevertheless, several use cases are anticipated to be active concurrently in the same operator network, thus requiring a high degree of flexibility and scalability of the 5G network.

Network slicing enables the operator to create networks customized to provide optimized solutions for different market scenarios which demands diverse requirements, e.g. in the areas of functionality, performance and isolation. However, there are some challenges and issues to support network slicing in the future 5G network:

How to achieve isolation/separation between network slice instances and which levels and types of isolation/separation will be required;

How and what type of resource and network function sharing can be used between network slice instances;

How to enable a UE to simultaneously obtain services from one or more specific network slice instances of one operator:

What is within 3GPP scope with regards to Network Slicing (e.g. network slice creation/composition, modification, deletion);

Which network functions may be included in a specific network slice instance, and which network functions are independent of network slices;

The procedure(s) for selection of a particular Network Slice for a UE;

How to support Network Slicing Roaming scenarios;

How to enable operators to use the network slicing concept to efficiently support multiple 3rd parties (e.g. enterprises, service providers, content providers, etc.) that require similar network characteristics.

More details (i.e., issues, problems and possible solutions) could be found in 3GPP TR 23.799, Study on Architecture for Next Generation System about how 3GPP applies the network slicing in the 5G network architecture.

It should be appreciated that the ideas describes here may be implemented as part of 5G network, possibly as part of a network slice. Functions that are described as being executed by a node such as the MME or S-GW may be executed by a virtualized network function.

SUMMARY

Mechanisms for efficient inter-system or inter-RAT (Radio Access Technologies) handover for the case when large numbers of devices need to perform a handover within a short time interval or even simultaneously are described. These mechanisms can include an aggregated Handover Procedure. An Aggregated Handover procedure can be enabled by a UE and can be indicated to the network entities by "Aggregated Handover Indication". The detection of target (H)eNB or WLAN can be triggered by user, GPS location, boarding time, or a travel or eTicket application etc. The UEs requesting Aggregated Handover within a time interval, i.e. Handover Window, can be processed with aggregated messages by the core network entities. For the following processes, one message can be used for multiple UEs with their parameters or info aggregated, instead of one for each UE. This avoids overloading the core network and radio access network (RAN) with too many handover messages for massive device handovers. These aggregated messages can include EAP Authentication and Authorization, Location Update and Subscriber Data, Proxy Binding (e.g. PMIPv6), Create/Modify IP-CAN Session, and Modify Bearer.

An Aggregated Seamless Handover procedure can be enabled by a UE and is indicated to the network entities by "Aggregated and Seamless Handover Indication" or by "Aggregated Handover Indication" and "Seamless Indication". The detection of target (H)eNB or WLAN can be triggered by user, Global Positioning System (GPS) location, boarding time, or a travel or eTicket application etc. The UEs requesting Aggregated Seamless Handover within a time interval, i.e. Handover Window, can be processed with aggregated messages by the core network entities. For the following processes, a direct interface between source (H)eNB/WLAN and target WLAN/(H)eNB can be used or seamless handover with multiple UEs' parameters or info aggregated into one message. The aggregated messages can include Handover Request and Ack between (H)eNB and WLAN, SN Status Transfer, Data Forwarding, Path Switch, and US Context Release.

For the following processes, one message can be used or multiple UEs with their parameters or info aggregated, instead of one for each UE. This avoids overloading the core network and RAN with too many handover messages for massive device handovers. The aggregated messages can include EAP Authentication and Authorization, Location Update and Subscriber Data, Proxy Binding (e.g. PMIPv6), Create/Modify IP-CAN Session and Modify Bearer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 10A-C is a diagram of an Aggregated Seamless HO Initiated by UE from WLAN to (H)eNB—Using Path Switch.

DETAILED DESCRIPTION OF ILLUSTRATIVE EMBODIMENTS

A "small cell" can be a localized geographic areas providing wireless network access via operator-licensed spectrum using 3GPP-defined cellular Radio Access Technologies (RATs).

A Femtocell is a class of device used for small cells, and designed as "plug-and-play" customer premises equipment (CPE) that can be installed in residential and enterprise environments without the need for an experienced technician. Public femtocell "hotspot" deployments are also supported. 3GPP refers to UMTS femtocells as Home NodeBs (HNBs) and LTE femtocells as Home eNodeBs (HeNBs). H(e)NBs use a broadband Internet connection to access a remote H(e)NB Management System (H(e)MS) for automatic configuration, while also providing backhaul access to the Mobile Core Network (MCN) for cellular services.

"WiFi hotspots" are defined as localized geographic areas providing wireless network access via unlicensed spectrum using RATs standardized by IEEE 802.11. In addition to direct access to local area networks and the Internet, WiFi access to the 3GPP EPC 106 network is also considered.

User Equipment (UE) is any device used directly by an end-user to communicate. It can be a hand-held telephone, a laptop computer equipped with a mobile broadband adapter, or any other device.

With respect to WiFi access to the EPC 106, the term "trusted WLAN access" applies to the MNO's belief that appropriate measures have been taken to safeguard the EPC 106 from access via the WLAN 103. Such measures are left to the discretion of the MNO and may, for example, include establishment of a tamper-proof fiber connection between the WLAN 103 and EPC 106, or establishment of an Internet Protocol Security (IPSec) security association between the WLAN 103 and a Security Gateway (SeGW) 122 at the EPC 106 edge. In contrast, if the WLAN access is deemed "untrusted" the WLAN 103 must interface with an evolved Packet Data Gateway (ePDG) at the EPC 106 edge, and the ePDG must establish an IPSec security association directly with each UE accessing the EPC 106 through the WLAN 103.

An "Integrated Small Cell and WiFi Network" (ISWN) can be a joint access network deployed by mobile operators for both small cells and WLAN 103 access. Such networks may include enhancements to multi-RAT terminal capabilities, small cell and WiFi access capabilities, EPC 106 network elements, and configuration/policy/traffic management functions.

A Handover Window can be a time interval (typically a very short time interval) that UEs are required to handover from source (H)eNB 202 or WLAN 103 to target WLAN 103 or (H)eNB 202. This time interval may be used:

for aggregating the Handover (HO) messages for multiple UEs, or for forming a group of UEs for group based handover.

Handover Window may be pre-configured with a default value, but may also be adjusted based on the quantity of handover requests, e.g. the Handover Window size may be reduced if more UEs request handover.

Figure 2:
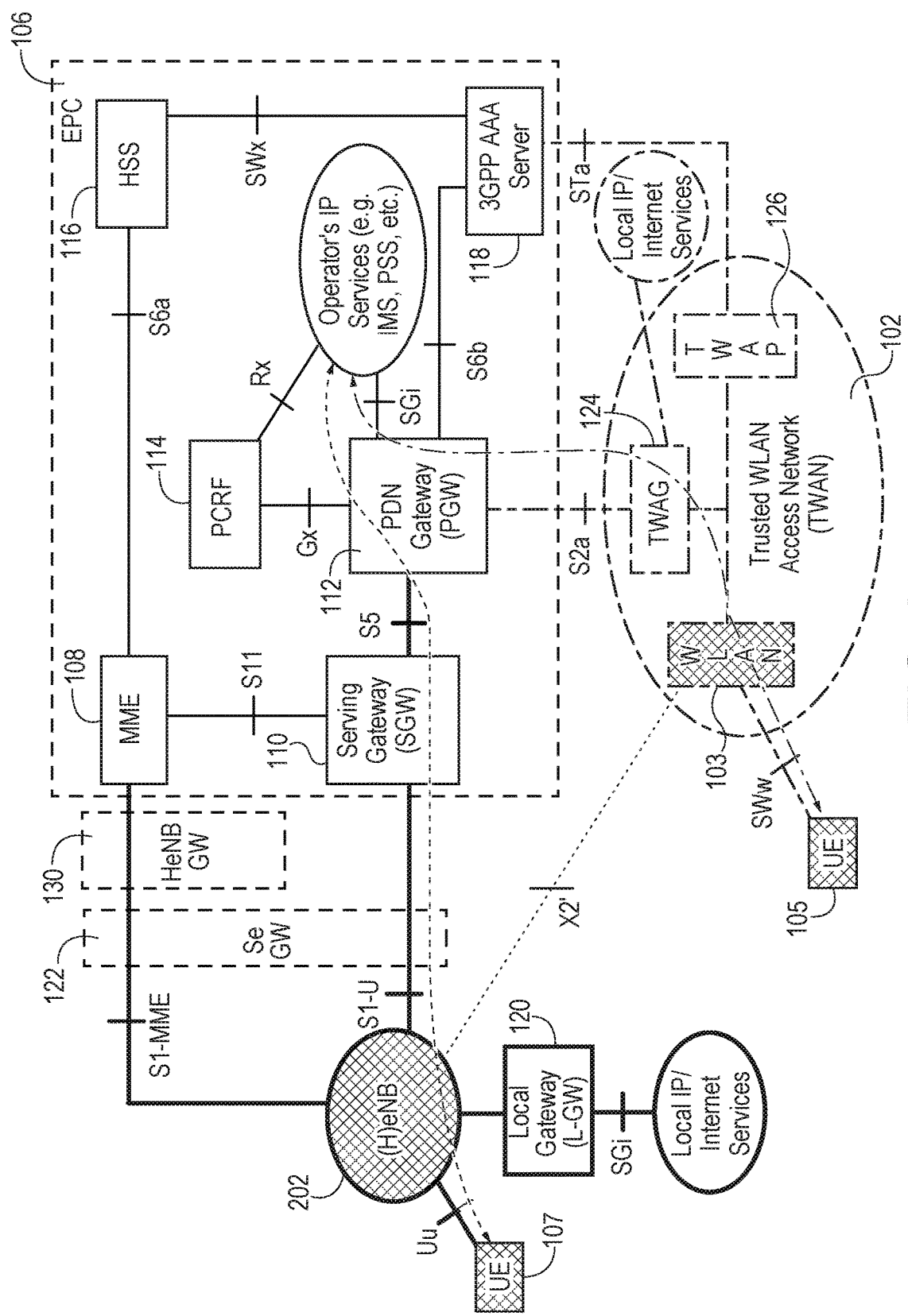
FIG. 2 is a diagram of an Extended X2 Interface between (H)eNB and WLAN.
Figure 3:
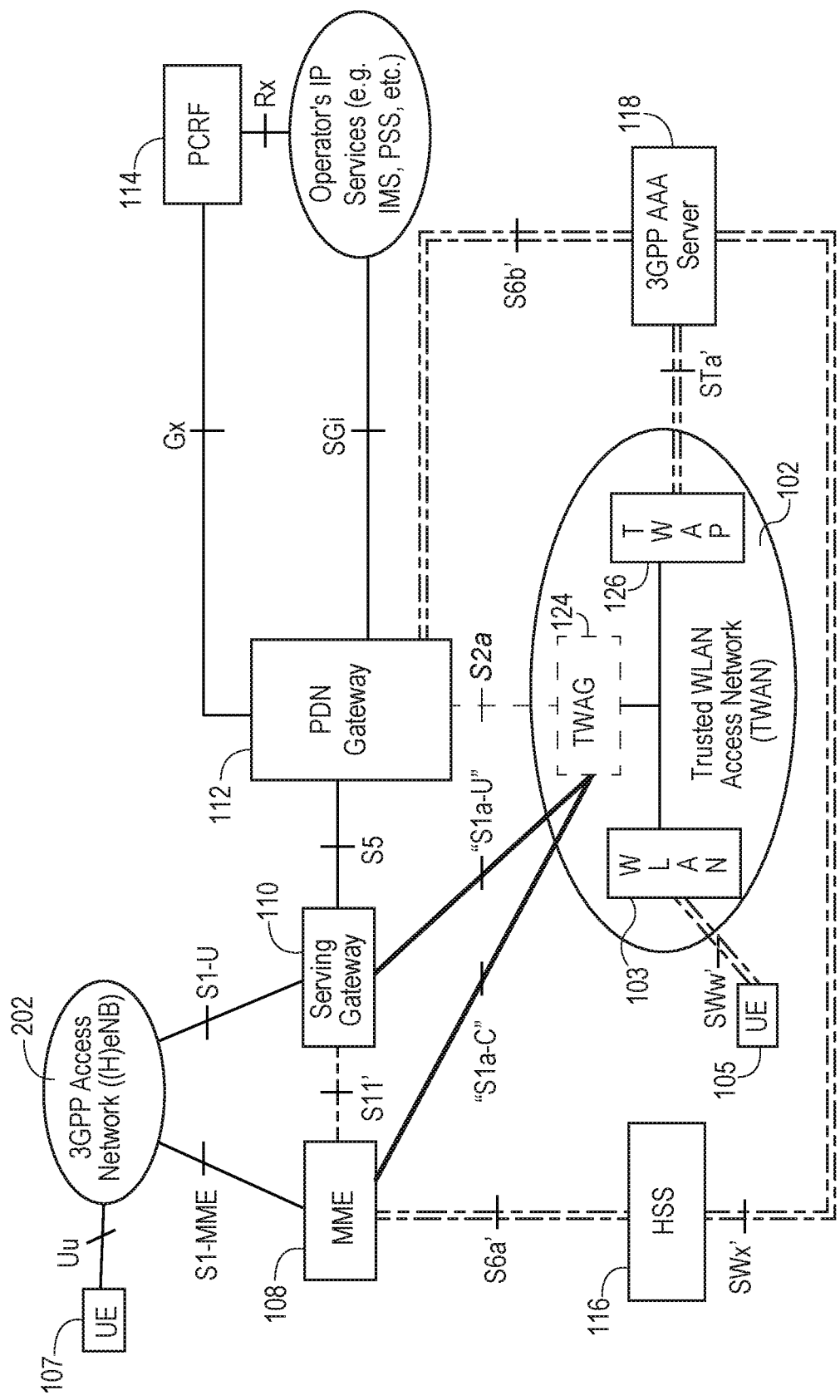
FIG. 3 is a diagram of a Non-roaming architecture for TWAN access via ISW-enabled MME and SGW.
Figure 4:
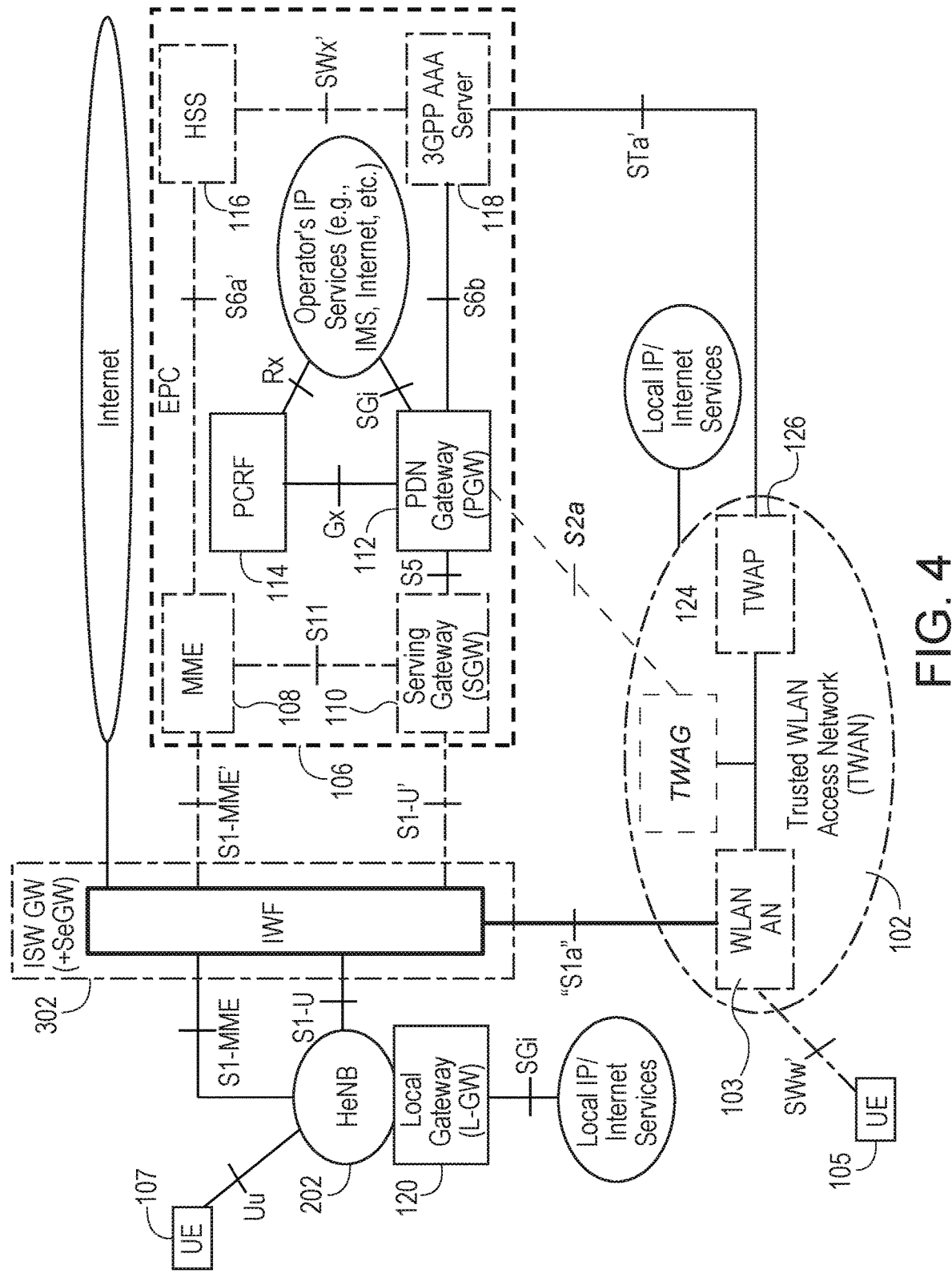
FIG. 4 is a diagram of a Non-roaming architecture for trusted WLAN access via ISW-GW.

Previously, multiple architectures for Small Cell and WLAN integration have been devised. FIGS. 2-4 show architectures that can be used for an aggregated handover.

FIG. 2 shows an architecture with an extended X2 interface between (H)eNB 202 and WLAN 103 for seamless inter-system or inter-RAT handover.

FIG. 3 shows an architecture with S1a-C interface between MME 108 and TWAG 124 for control-plane and S1a-U between SGW 110 and TWAG 124 for enhancing inter-system or inter-RAT mobility management.

FIG. 4 shows the architecture with Integrated Small Cell and WiFi Gateway (ISW GW) 302 to enable MME 108 controlled or EPC 106 core network initiated inter-system or inter-RAT handover.

Figure 5:
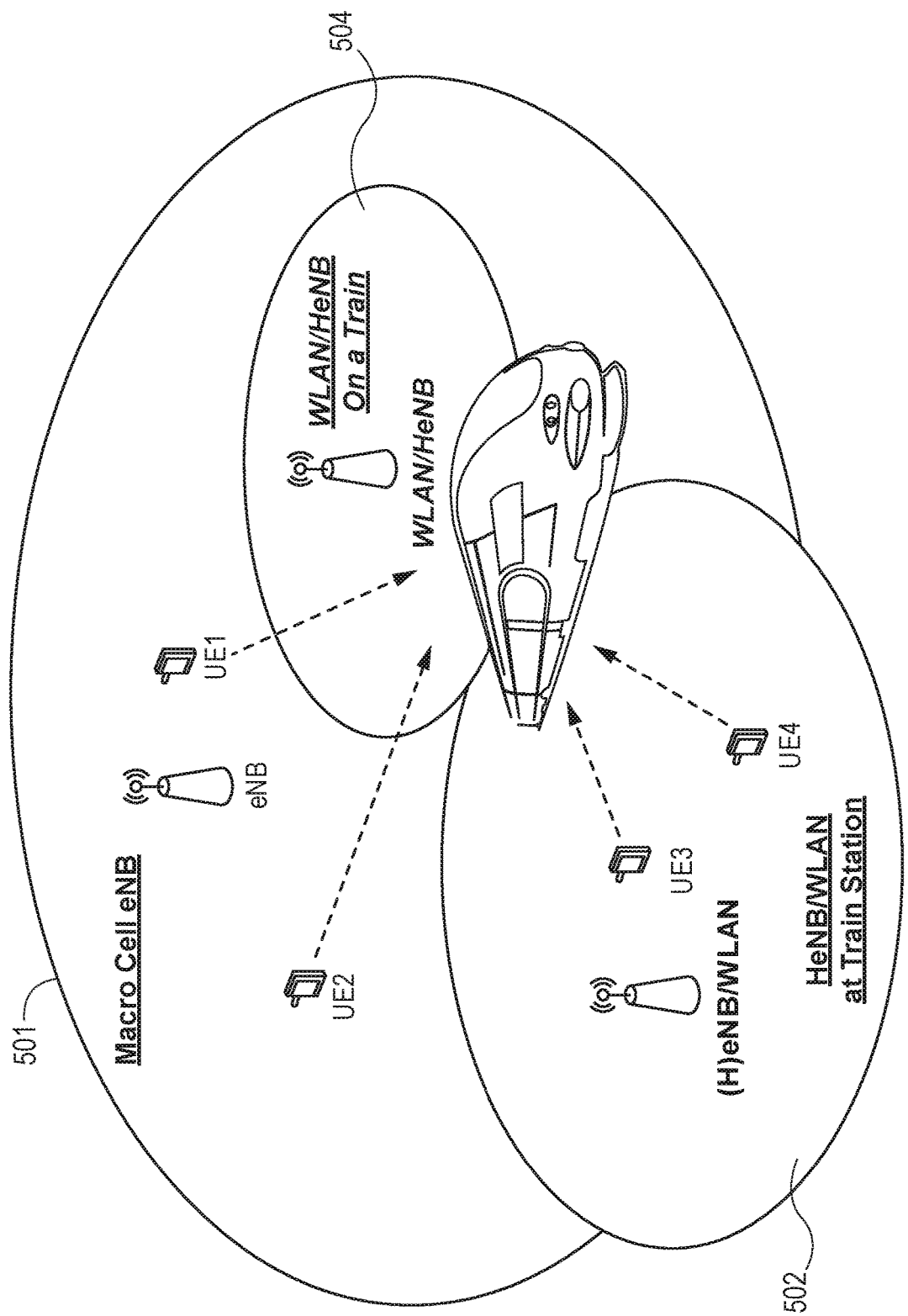
FIG. 5 is a diagram of Use Case I (Handover to a Targeted (H)eNB/WLAN during a Time Interval).

As the IoT is becoming a reality, more and more devices are connected via different wireless access networks to support our modern daily life and due to the increasing mobility in our society, more and more devices are moved around within the massive transportation systems (e.g. international airports, central train stations, and major sea ports, etc.). Among them, some devices, such as health monitoring or object tracking devices, require continuous connected services. For example, while boarding a train, many devices move from a macro cell eNB 501 or HeNB/WLAN 502 at a train station to the WLAN/HeNB 504 on the train—as the Use Case I illustrates in FIG. 5. For another example, while disembarking a train, many devices move from the WLAN/HeNB 504 on the train into a macro cell eNB 501 or HeNB/WLAN 502 at a train station—as Use Case II illustrates in FIG. 6.

Figure 7:
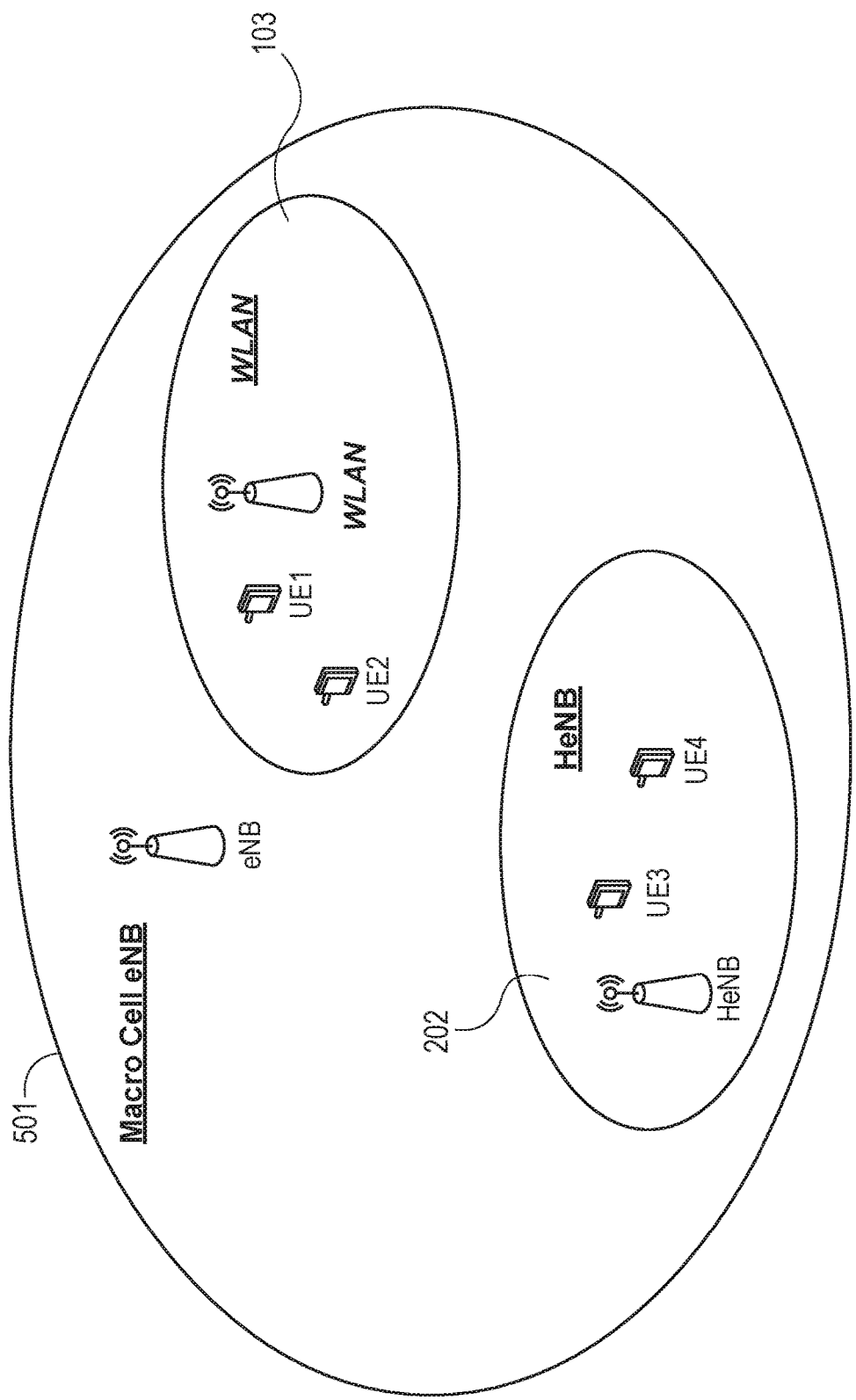
FIG. 7 is a diagram of Use Case III (Handover to/from a (H)eNB/WLAN after Turned ON/OFF).

Another example is shown in FIG. 7 as Use Case III in a scalable and self-organized heterogeneous network system, where either HeNB 202 or WLAN 103 may be turned on or off for managing the access network congestion, interference among the cells, system power consumption, as well as the system maintenance due to reconfiguration or failure fixing. In this case, the UEs will conduct handover to or from the HeNB 202/WLAN 103 simultaneously from or to a macro cell eNB 501 when the HeNB 202/WLAN 103 is turned on or off.

As described below each device (i.e. a UE) is individually attached to the EPC 106 core network either via LTE macro cell 501 or WLAN 103 and devices are also handled individually during inter-system or inter-RAT handover. For the Use Case I, II and III, the inter-system or inter-RAT handover may be delayed or even fail due to the congestion or overload in the core network or RAN caused by the massive number of devices requiring handover in a very short time or even simultaneously. This may cause discontinuity of services to those devices requiring continuous connections.

The problem is: how to handle the inter-system or inter-RAT handover more efficiently and reliably, when large numbers of devices require the handover to a target (H)eNB/WLAN within a short time interval or even simultaneously?

As exampled in Use Case I, II and III, the EPC 106 core network may be overloaded with handover signaling and messages if a large number of devices conduct handover to a targeted (H)eNB 202 or WLAN 103 during a short time interval or simultaneously. To reduce the handover overhead within the EPC 106 core network, we propose aggregated messaging among the network entities such as MME 108, SGW 110, PGW 112, and HSS 116/AAA server 118 within EPC 106 that can be particularly useful under certain conditions:

- there are a large number of devices requiring smooth or seamless handover from a source (H)eNB 202 or WLAN 103 to a known target WLAN 103 or (H)eNB 202;
- handover requests are sent within a very short time interval (i.e. Handover Window) or simultaneously;
- source (H)eNB 202 and target WLAN 103 are collocated;
- source WLAN 103 and target (H)eNB 202 are collocated.

The mechanisms are illustrated as handover between (H)eNB 202 and WLAN 103 in the examples in this section, but they may also be applied to the handovers with large member of devices or UEs between collocated access networks.

Aggregated Handovers

Figure 1:
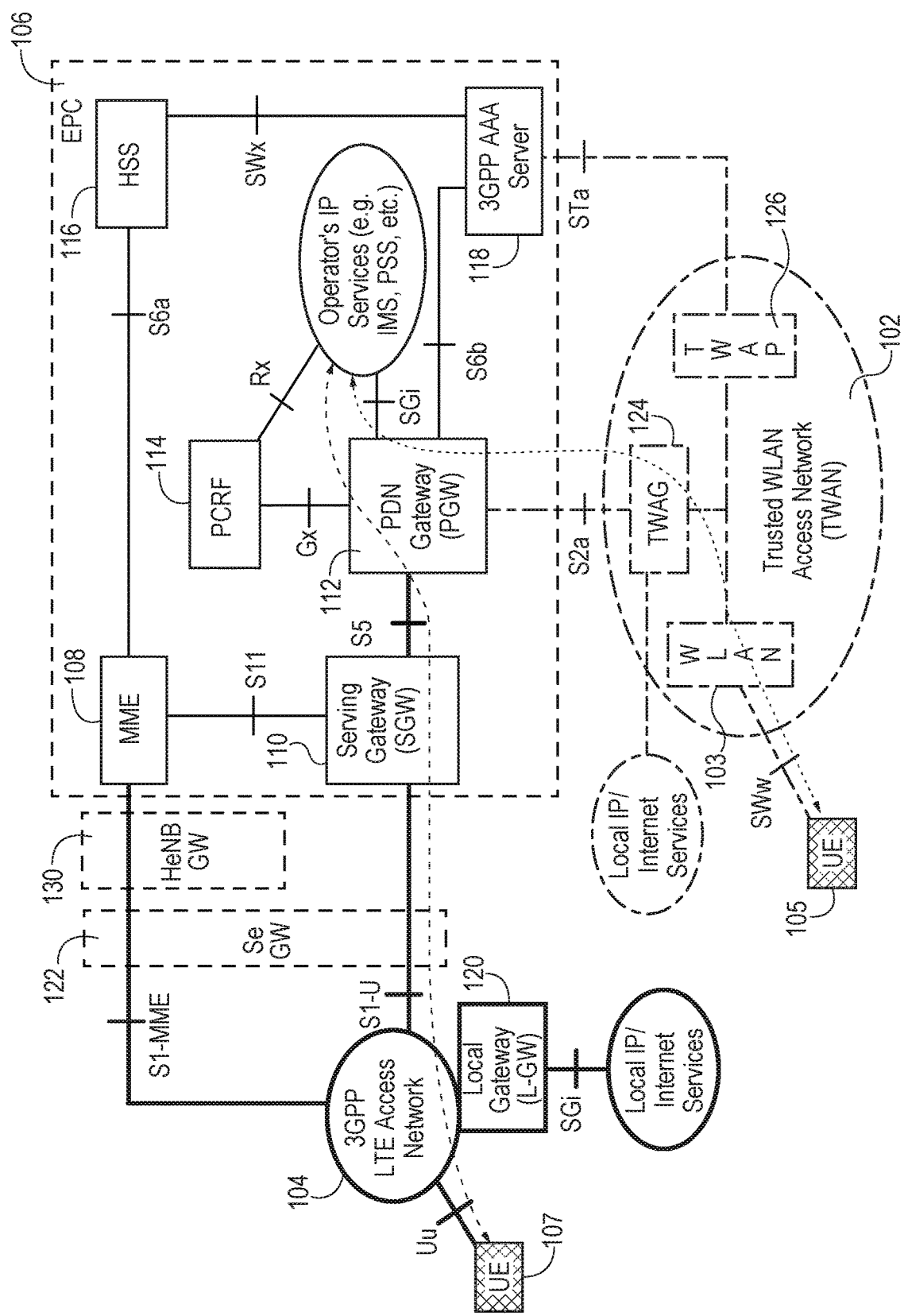
FIG. 1 is a diagram of a Non-roaming Architecture for Trusted WLAN and 3GPP LTE Access to EPC.

We use mainly Use Case I or Use Case II as an example to explain the aggregated handover scheme for the architecture shown in FIG. 1. Nevertheless, the same aggregation schemes may also be applicable to Use Case III, as well as the other architectures shown in FIGS. 2-4.

Aggregated Handovers Initiated by UEs from WLAN to (H)eNB

For the architecture shown in FIG. 1, i.e. the TWAN 102 is anchored at PGW 112 for accessing the EPC 106, we propose aggregated handovers initiated by UEs, from a WLAN 103 at a train station to the HeNB on a train as Use Case I or from a train's WLAN 103 to the eNB at train station as Use Case II. The call flow shown in FIG. 8A-B, which is described below in the following steps.

Step "a" and "b" may be sequential during a Handover Window or simultaneous. The steps below only refer to TWAN 102, not to specific functions internal to TWAN 102 (i.e. TWAG 124, TWAP 126 and WLAN AN 103). TWAN 102 and WLAN 103 are interchangeable in the descriptions.

This call flow may also apply to PMIP based S5 between SGW 110 and PGW 112 with step 6 "Create Session Request" and step 8 "Create Session Response" replaced with "Proxy Binding Update" and "Proxy Binding Ack" respectively, and step 12 "Modify Bearer Request" and step 13 "Modify Bearer Response" replaced with "Proxy Binding Update" and "Proxy Binding Ack" respectively.

Figure 8A:
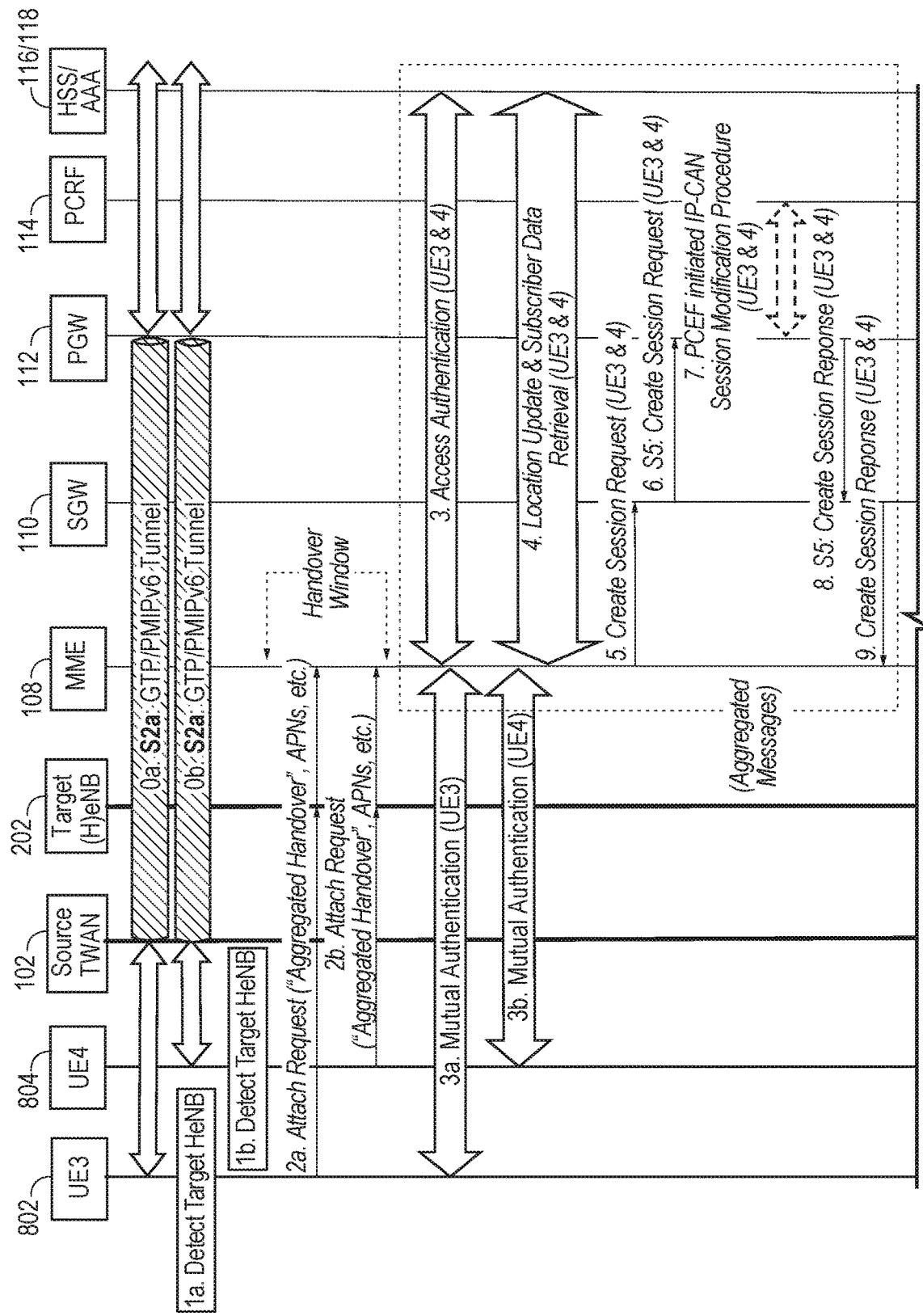
FIG. 8A-B is a diagram of an Aggregated Handovers Initiated by UEs from WLAN to (H)eNB.
Figure 8B:
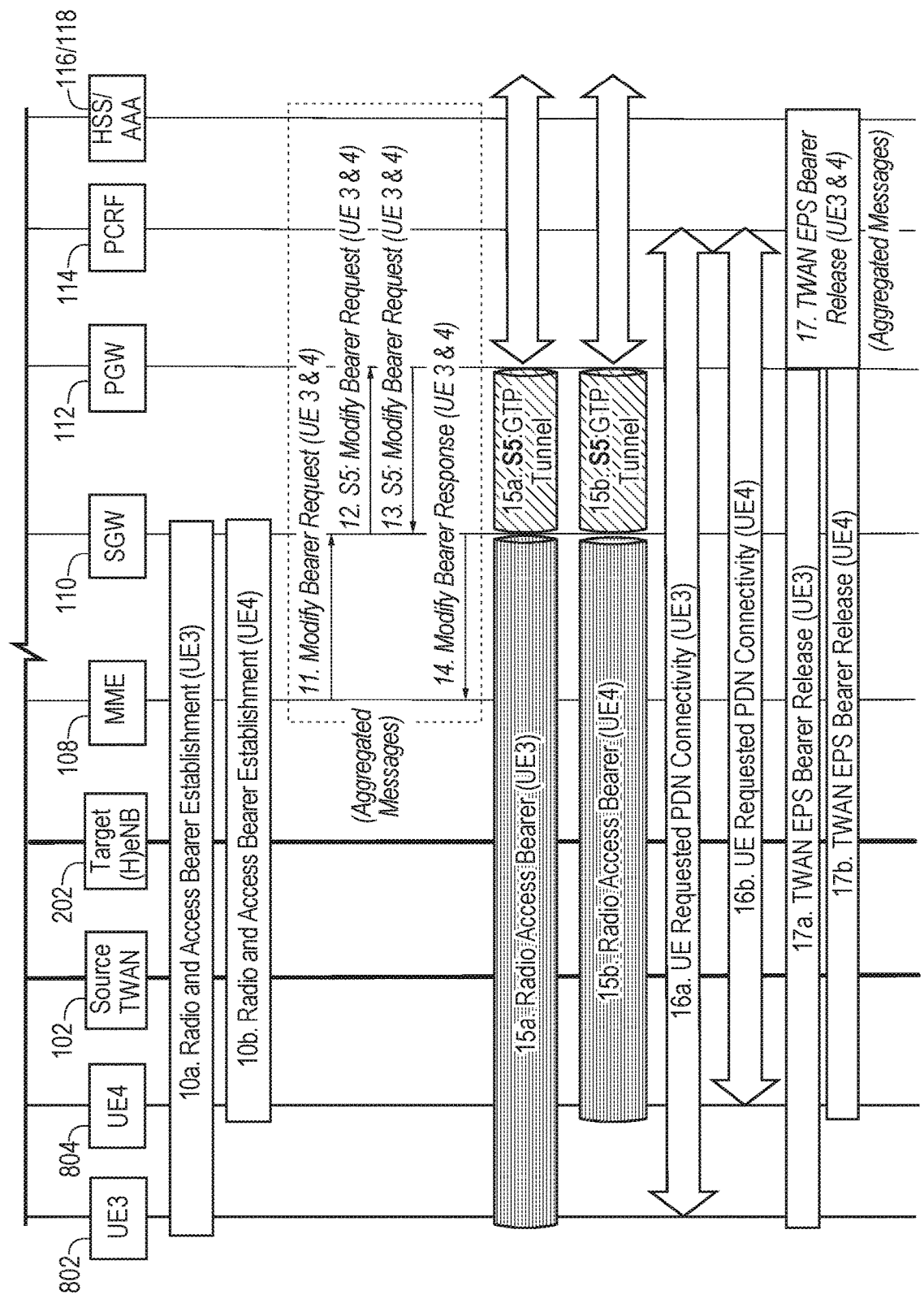

In Step 0 of FIG. 8A-B, UE3 802 and UE4 804 have established PDN connections from the source TWAN 102 at the train station or on the train to the PGW 112 of EPC 106 core network with PMIPv6 or GTP tunnel on S2a interface between TWAN 102 and PGW 112.

In Step 1 of FIG. 8A-B, UE3 802 and UE4 804 detect the target (H)eNB 202 while boarding a train or the target (H)eNB 202 while arriving at a train station.

The target (H)eNB 202 can be pre-known to UEs either via pre-configuration by the users (for instance it may be manually entered) or notification by a travel or e-ticket application.

UE3 802 and UE4 804 decide to transfer their sessions (i.e. handover) from the source TWAN 102 to target (H)eNB 202. Alternatively, the Handover (HO) procedure may also be automatically triggered by the boarding or arriving process.

For Use Case III, the handover procedure may also be triggered by a Cell (i.e. (H)eNB 202) or a WLAN 103 when it is scheduled or triggered to turn off so that the UEs may move over to the macro cell 104, In Step 2 of FIG. 8A-B, UE3 802 and UE4 804 send an Attach Request to the MME 108 individually with Request Type indicating "Aggregated Handover" (which may be enabled by the user via the GUI) Attach with their APNs corresponding to the PDN connections via the source TWAN 102 as well as other aggregated handover parameters, such as "Handover Window".

In Use Case III, a Cell (i.e. (H)eNB 202) or a WLAN 103 may indicate "Aggregated Handover" and the "Handover Window" in its handover request.

When the MME 108 receives an Aggregated Handover request, it may set a timer to see if any other individual attach requests are received within a time window (i.e. the Handover Window used by MME for aggregating the handover). If other attach requests are received within the time window, they may be aggregated with the original request. This time window, i.e. the Handover Window, may also be requested by the user in UE's handover request. The UE's Handover Window may be either preconfigured via the GUI and then may be updated later with the handover requester (i.e. MME 108, Source or target (H)eNB 202/TWAN 102) based on the amount of UEs requesting handover.

The MME may also use the Handover Window specified by each UE to decide the priority of grouping the UEs for aggregated handover, e.g. UEs with smaller Handover Window requested may be grouped first for aggregated handover than the other UEs with larger Handover Window requested (i.e. more tolerant to the delay caused by the aggregated handover).

Letting the UE to indicate "Aggregation" with "Handover Window" configured will help the network know how much delay tolerance that the UE allows, e.g. some device requiring continuous service may define a tight "Handover Window" and therefore may get grouped first for aggregated handover by the core network.

The core network may also make aggregated handover messaging transparent to UE—deciding to aggregate or not based on the network conditions with the aggregation schemes.

In Step 3 of FIG. 8A-B, the MME 108 may contact the HSS 116 for Access Authentication for both UE3 802 and UE4 804 with aggregated Authentication Request (in the Access Authentication messages as step 3 shown in the call flow), MME 108 derives the keys for UE3 802 and UE4 804 based on the aggregated Authentication Answer (in the Access Authentication messages as step 3 shown in the call flow) from HSS 116 since both UE3 802 and UE4 804 indicate "Aggregated Handover" in their Attach Request messages, and then MME 108 may conduct mutual authentications with UE3 802 and UE4 804 as step 3*a* and 3*b* respectively.

In Step 4 of FIG. 8A-B, after successful authentication with UE3 802 and UE4 804, the MME 108 may perform aggregated location update procedure and subscriber data retrieval from the HSS 116 for both UE3 802 and UE4 804. Since the Request Type is "Aggregated Handover", the PGW 112 identity for both UE3 802 and UE4 804 conveyed to the MME 108 will be stored in PDN subscription context. The MME 108 receives information on the PDNs that UE3 802 and UE4 804 are connected to over the source TWAN 102 in the Subscriber Data obtained from the HSS 116.

In Step 5 of FIG. 8A-B, the MME 108 sends a Create Session Request message to the SGW 110, which includes International Mobile Subscriber Identities (IMSIs) of UE3 802 and UE4 804, MME 108 Context ID, PGW 112 address (same PGW 112 for UE3 802 and UE4 804), Handover Indication (request type is Aggregated Handover), and APNs of UE3 802 and UE4 804. Since the Request Type is "Aggregated Handover", an Aggregated Handover Indication information is included.

In Step 6 of FIG. 8A-B, the SGW 110 sends an aggregated Create Session Request (Aggregated Handover Indication) message to the PGW 112 via interface S5 in the VPLMN (roaming) or HPLMN (non-roaming) for both UE3 802 and UE4 804. Since Aggregated Handover Indication is included, the PGW 112 would not switch the tunnel from source TWAN 102 IP access to (H)eNB 202 at this point.

In Step 7 of FIG. 8A-B, since Aggregated Handover Indication is included, the PGW 112 may execute an aggregated PCEF-Initiated IP CAN Session Modification Procedure with the PCRF 114 to report the changes in IP-CAN type for both UE3 802 and UE4 804. Or, if UE3 802 and UE4 804 have disconnected from the default PDN before handover, then the PGW 112 executes an aggregated PCEF initiated IP CAN Session Establishment Procedure.

Since Aggregated Handover Indication is included in step 7, the PGW 112 defers any modification to UE3 802 and UE4 804's PCC Rules for charging and policy until step 12.

Depending on the active UE3 802 and UE4 804's PCC rules, the dedicated bearers for UE3 802 and UE4 804 may be created as part of default bearer establishment or immediately afterwards.

In Step 8 of FIG. 8A-B, the PGW 112 responds with an aggregated Create Session Response message to the SGW 110 via interface S5, which contains the IP addresses or the prefixes that were assigned to UE3 802 and UE4 804 while they were connected to the source TWAN 102, as well as the Charging IDs previously assigned to UE3 802 and UE4 804's PDN connections (i.e. default and dedicated bearers) in the TWAN 102.

In Step 9 of FIG. 8A-B, the SGW 110 returns an aggregated Create Session Response message to the MME 108, which includes the IP addresses of UE3 802 and UE4 804. This message also serves as an indication to the MME 108 that the S5 bearer setup and update for both UE3 802 and UE4 804 has been successful. At this step the PMIPv6 or GTP tunnel(s) over S5 are established.

In Step 10 of FIG. 8A-B, Radio and Access bearers are established for UE3 802 or UE4 804 at this step via the target (H)eNB 202.

In Step 11 of FIG. 8A-B, the MME 108 sends an aggregated Modify Bearer Request message for both UE3 802 and UE4 804 to the SGW 110, which includes (H)eNB 202 address and TEIDs (for UE3 802 and UE4 804), and Aggregated Handover Indication. Note: Steps 12 and 13 are not performed if the PDNs are reconnected after handoff by UE3 802 and UE4 804 in step 16.

In Step 12 of FIG. 8A-B, since the Aggregated Handover Indication is included, the SGW 110 sends an aggregated Modify Bearer Request message to the PGW 112 via interface S5—to prompt the PGW 112 to switch routing packets to the SGW 110 for the default and any dedicated EPS bearers established for both UE3 802 and UE4 804.

In this step, the PGW 112 applies any modification to UE3 802 and UE4 804's PCC Rules received from the PCRF 114, if there is PCRF 114 interaction in step 8 for dynamic PCC. The Charging IDs previously in use for UE3 802 and UE4 804's default and dedicated bearers in source TWAN 102 on the S2a interface now may apply to UE3 802 and UE4 804's corresponding default bearers in target (H)eNB 202 with the same QCI and ARP in source TWAN 102. If dedicated bearers are created for UE3 802 and UE4 804, new Charging IDs may be assigned by the PGW 112 for each of them.

In Step 13 of FIG. 8A-B, the PGW 112 acknowledges by sending aggregated Modify Bearer Response to the SGW 110 via interface S5.

In Step 14 of FIG. 8A-B, the SGW 110 acknowledges by sending aggregated Modify Bearer Response message to the MME 108 with the EPS Bearer Identities for both UE3 802 and UE4 804.

In Step 15 of FIG. 8A-B, the UE3 802 and UE4 804 may send and receive data at this point via the Radio and Access Bearer, i.e. the Radio Bearer between the UE and (H)eNB 202 and GTP tunnel on S1-U between (H)eNB 202 and SGW 110, and GTP tunnel on S5 interface between SGW 110 and PGW 112.

In Step 16 of FIG. 8A-B, for connectivity to multiple PDNs, UE3 802 or UE4 804 establishes connectivity to each PDN that is being transferred from source TWAN 102, besides the PDN connection established in steps 3-15, by executing the UE requested PDN connectivity procedure herein.

In Step 17 of FIG. 8A-B, the PGW 112 initiates resource allocation deactivation procedure in the TWAN 102 for both UE3 802 and UE4 804. This may include the release PGW 112 resources (e.g. tunneling or bearers) associated with the PDN connections via the source TWAN 102, Internet Key Exchange version 2 (IKEv2) and IPSec tunnels with ePDG in source TWAN 102 for both UE3 802 and UE4 804, as well as the UE's disassociation with the WLAN 103 if the UE is still associated with the WLAN 103. Then the PGW 112 may notice the 3GPP AAA that both UE3 802 and UE4 804's disconnections with the source TWAN 102. The PGW 112 may also notice the PCRF 114 for successful PCRF 114 initiated IP-CAN modification for both UE3 802 and UE4 804.

Figure 14A:
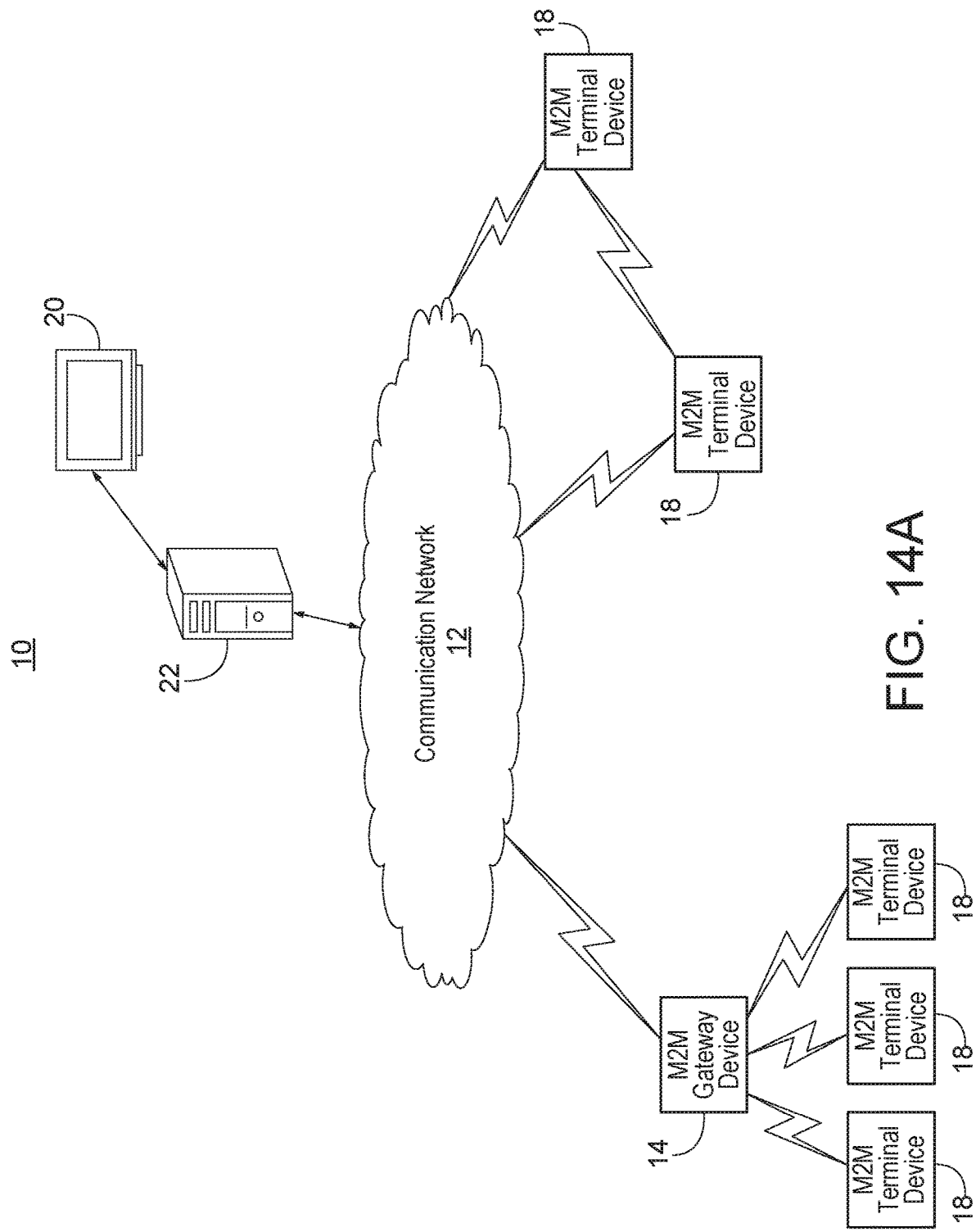
FIG. 14A is a diagram of a M2M/IoT/WoT communication system that includes a communication network.
Figure 14B:
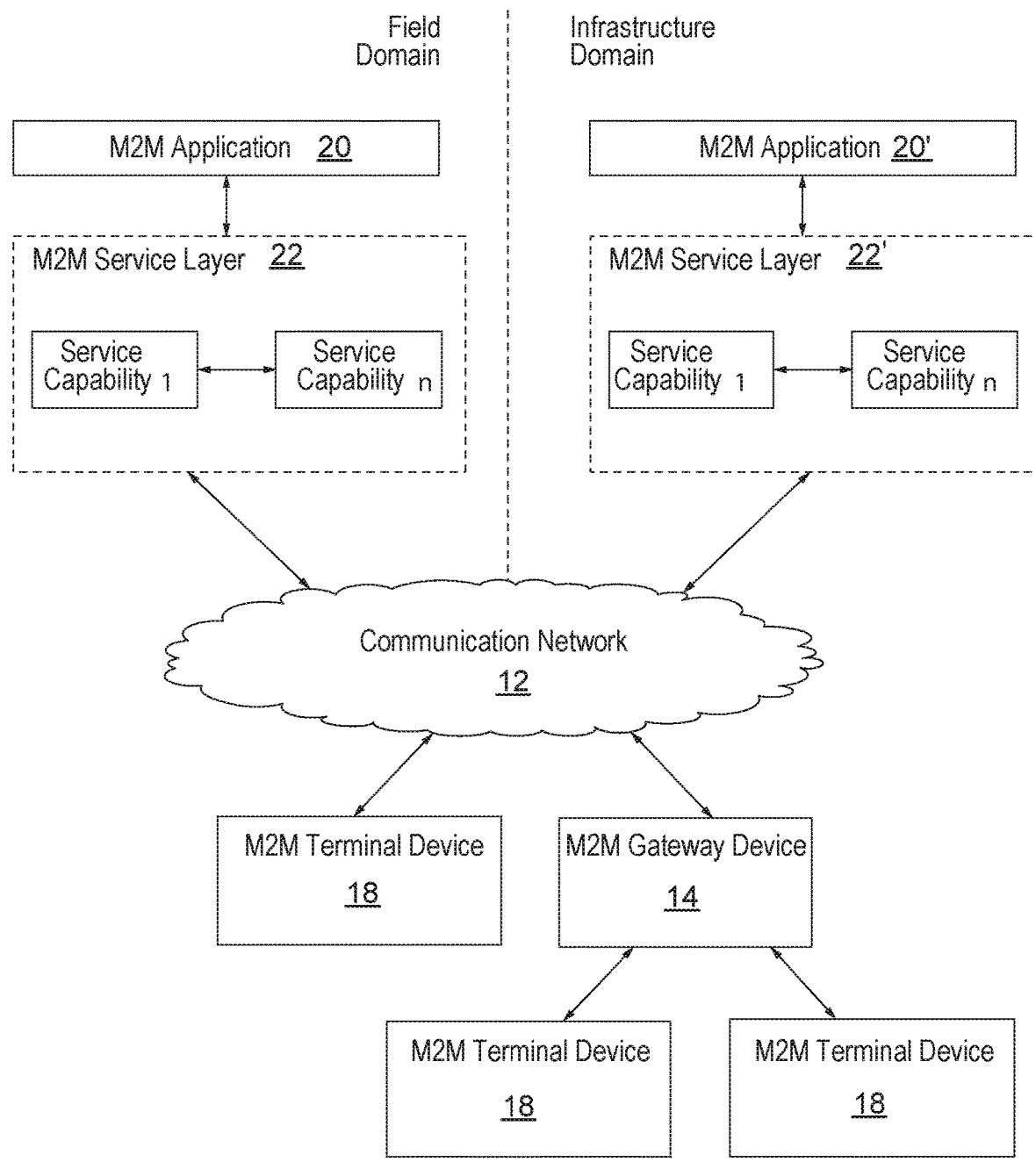
FIG. 14B is a diagram of an illustrated M2M service layer in the field domain that provides services for the M2M application, M2M gateway devices, and M2M terminal devices and the communication network.
Figure 14C:
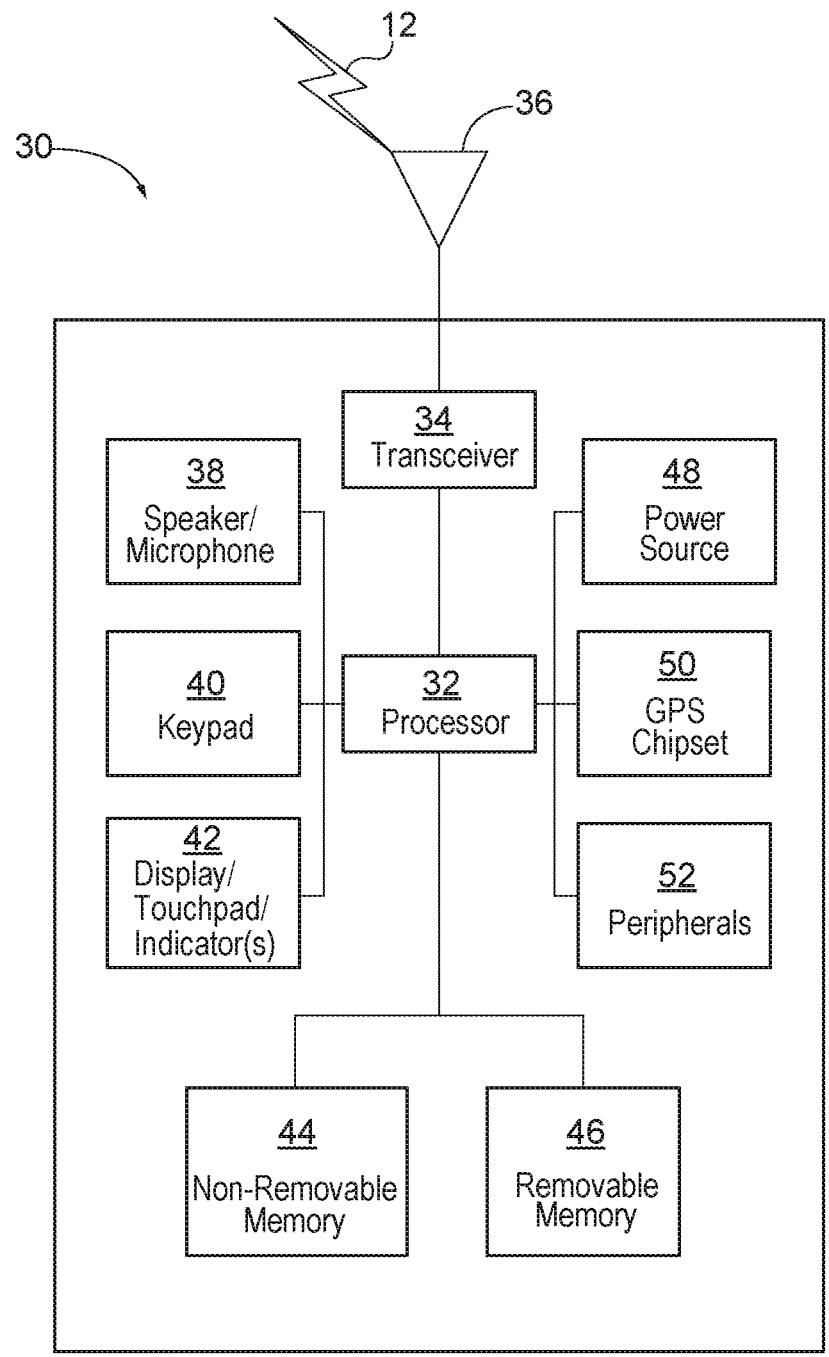
FIG. 14C is a diagram of an exemplary device that may be used to implement any of the network nodes described herein.
Figure 14D:
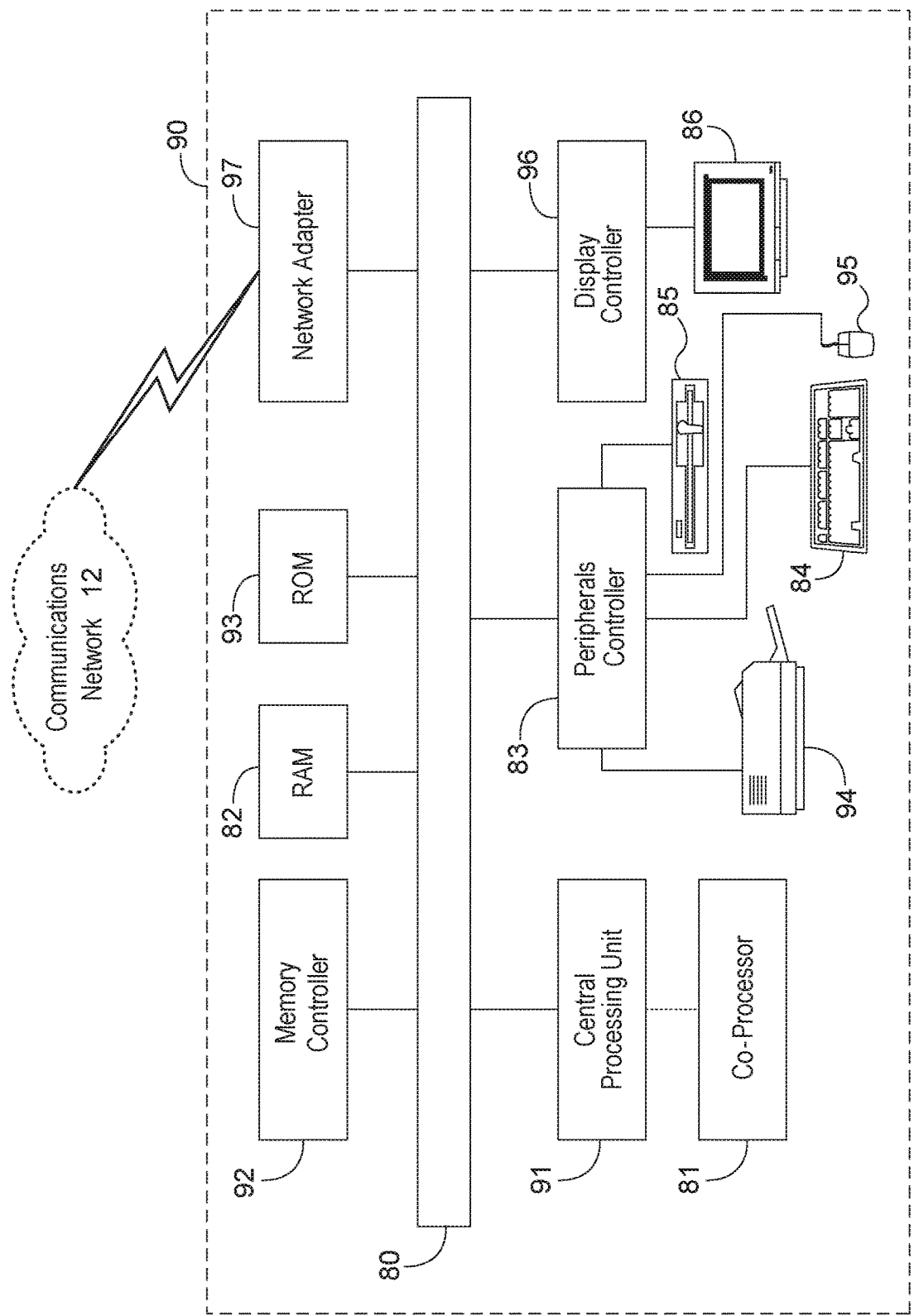
FIG. 14D is a block diagram of a computer system or server that may be used to implement any of the network nodes described herein.

It is understood that the entities performing the steps illustrated in FIG. 8A-B are logical entities that may be implemented in the form of software (i.e., computer-executable instructions) stored in a memory of, and executing on a processor of, a network node or computer system such as those illustrated in FIG. 14C or FIG. 14D. That is, the method(s) illustrated in FIG. 8A-B may be implemented in the form of software (i.e., computer-executable instructions) stored in a memory of a network node, such as the node or computer system illustrated in FIG. 14C or FIG. 14D, which computer executable instructions, when executed by a processor of the node, perform the steps illustrated in FIG. 8A-B. It is also understood that any transmitting and receiving steps illustrated in FIG. 8A-B may be performed by communication circuitry of the node under control of the processor of the node and the computer-executable instructions (e.g., software) that it executes.

Aggregated Handovers Initiated by UEs from (H)eNB 202 to WLAN 103

Figure 9A:
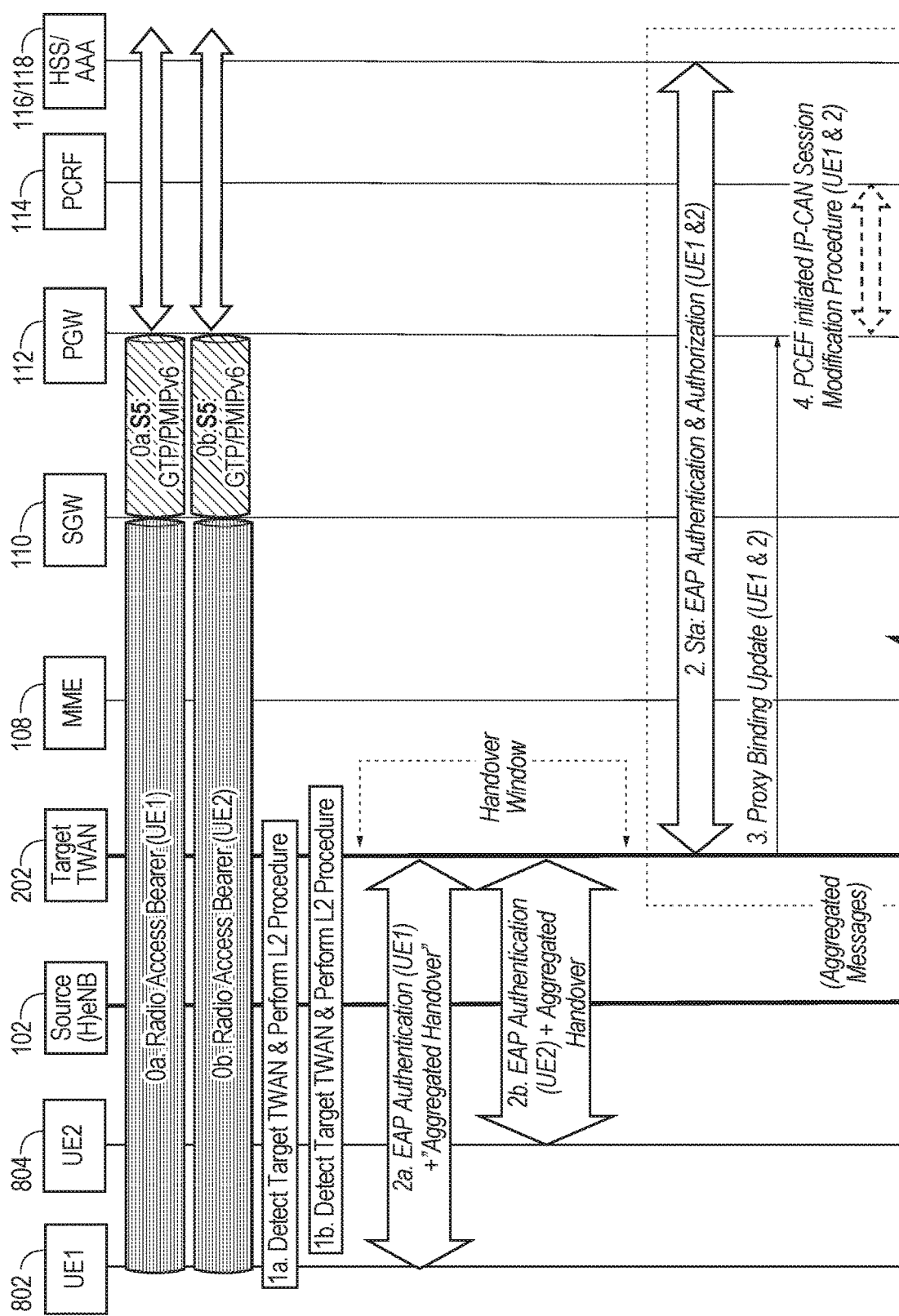
FIG. 9A-C is a diagram of an Aggregated Handovers Initiated by UEs from (H)eNB to WLAN.
Figure 9B:
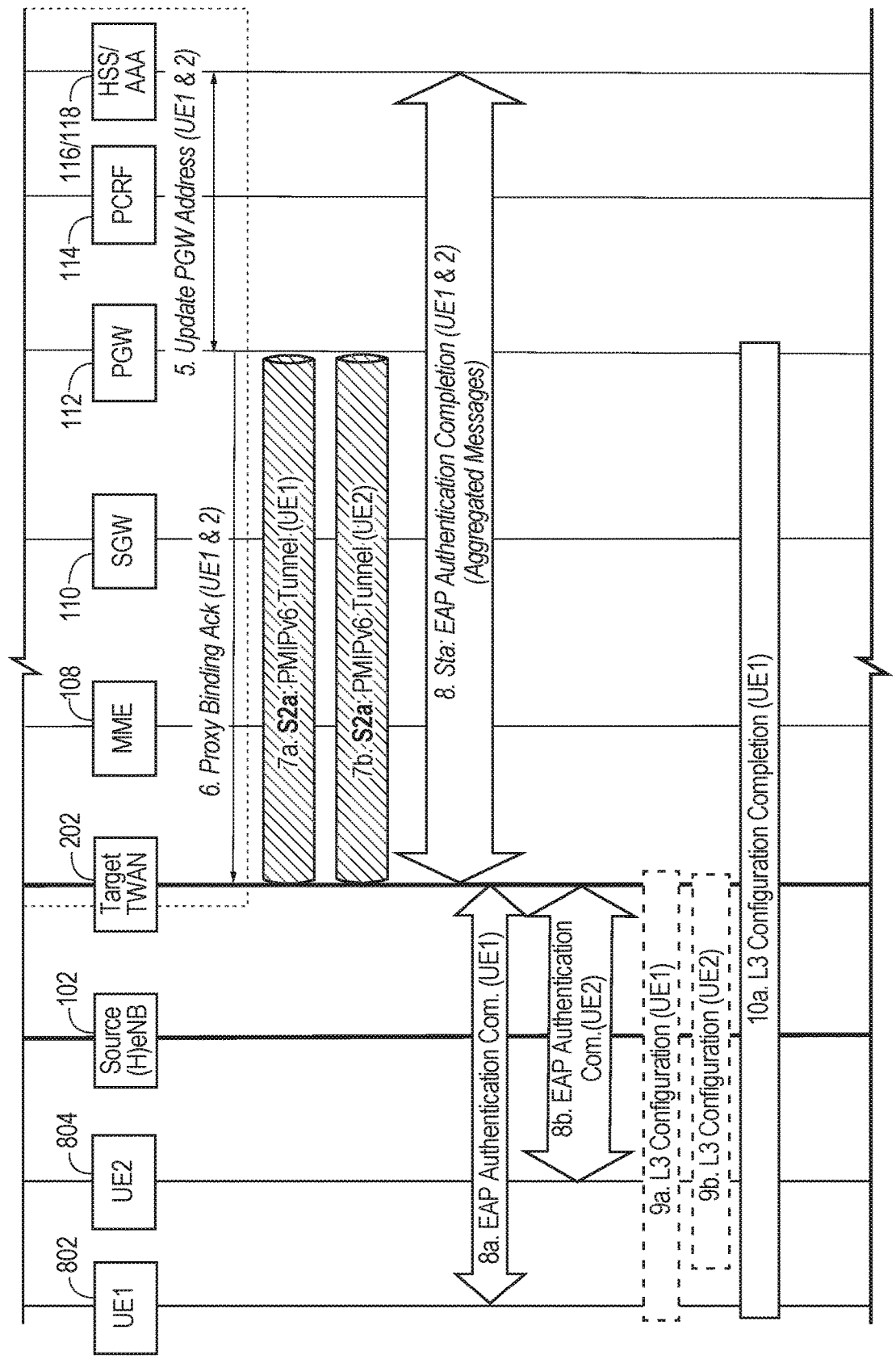
Figure 9C:
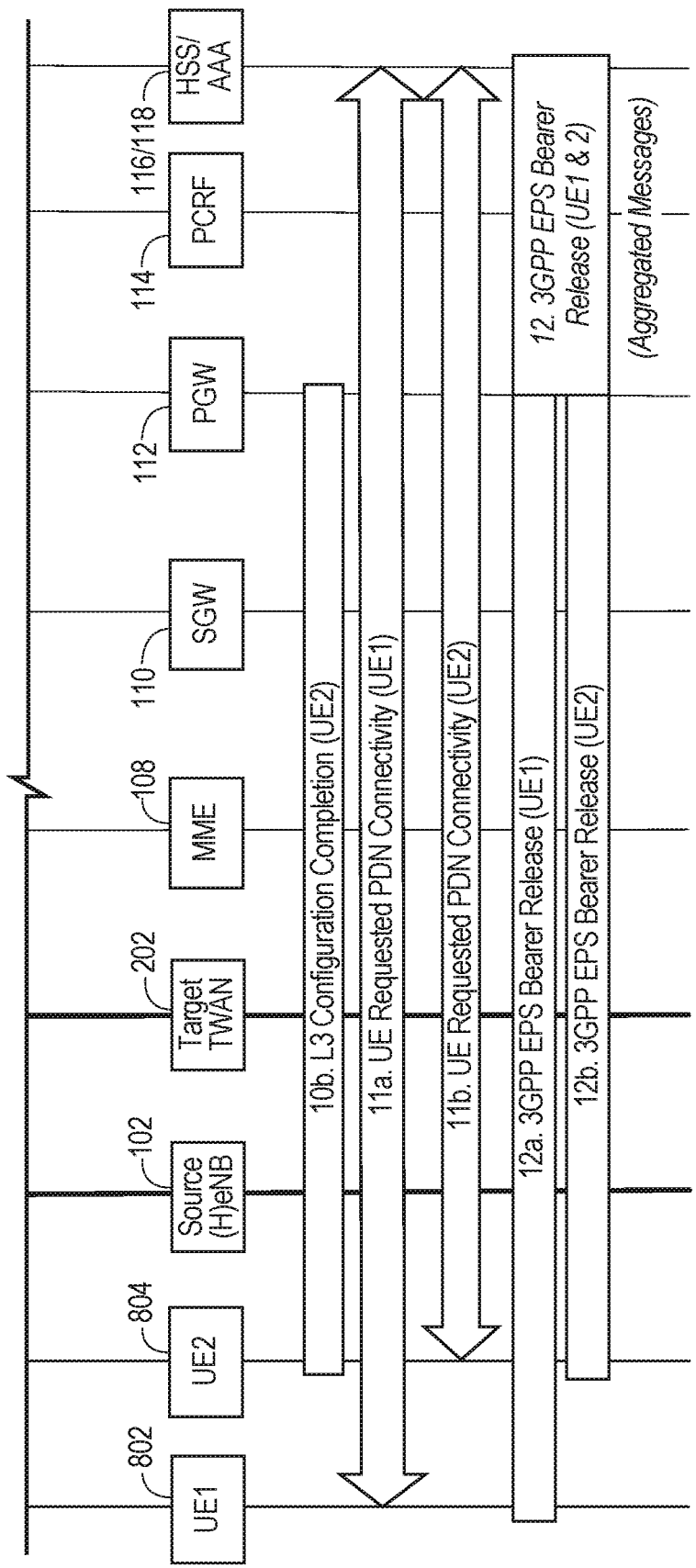

Another example of aggregated handovers initiated by UEs is shown in FIG. 9A-C for handover from the (H)eNB 202 at a train station to the WLAN 103 on a train. It is exampled with the following steps.

Step "a" and "b" may be sequential or simultaneous. The steps below only refer to TWAN 102, not to specific functions internal to TWAN 102 (i.e. TWAG 124, TWAP 126 and WLAN AN). TWAN 102 and WLAN 103 are interchangeable in the descriptions.

This call flow may also apply to GTP on S2a between TWAN 102 and PGW 112 with step 3 and 6 as "Create Session Request" and "Create Session Response" respectively.

In Step 0 of FIG. 9A-C, UE1 and UE2 are already connected with active PDN connections to different APNs over multiple accesses via the macro cell Source eNB or small cell HeNB covering the train station. The PDN connections have PMIPv6 or GTP tunnels on the S5 interface.

In Step 1 of FIG. 9A-C, UE1 and UE2 are triggered to detect the target TWAN 102 by GPS location, boarding time, or a travel or eTicket application. UE1 and UE2 detect the target TWAN 102 based on the received signal strength or channel quality indication. The target TWAN 102 is pre-known to UEs either via pre-configuration by the users or notification by a travel or e-ticket application. UE1 and UE2 decide to transfer its sessions (i.e. Aggregated Handover) from the source (H)eNB 202 at the train station to the target TWAN 102 on the train, and then to perform L2 procedures such as association with target TWAN 102 accordingly.

In Step 2 of FIG. 9A-C, UE1 and UE2 send EAP messages for authentication individually including "aggregated handover" indication, and the target TWAN 102 transfers the aggregated EAP messages for both UE1 and UE2 to the 3GPP AAA server 118 via STa interface with an indication of the modes of operation (e.g. single-connection mode with either EPC 106 or NSWO). 3GPP AAA server 118 returns aggregated message with both UE1 and UE2's subscription data which lists all the authorized APNs and additional PDN GW selection information for both UE1 and UE2 in target TWAN 102. 3GPP AAA server 118 may also include default APNs for UE1 and UE2 in target TWAN 102 that may be different from the default APNs for other accesses (e.g. in source (H)eNB 202), in case of transparent single-connection mode. The 3GPP AAA server 118 also returns to the TWAN 102 the User Identities to be used to identify the UE1 and UE2 for session creation.

In Step 3 of FIG. 9A-C, the TWAN 102 selects the S2a protocol variant (i.e. PMIPv6 in this case). If the UE1 and UE2 did not provide the requested APNs in step 2, the TWAN 102 selects the default APNs for both UE1 and UE2 according to UE1 and UE2 subscription data received in step 2. If UE1 and UE2 requested EPC 106 access and indicated their APNs in step 2, the TWAN 102 verifies that the APNs are allowed by subscriptions and selects those APNs. The MAG function of TWAN 102 sends an aggregated Proxy Binding Update message (MN-NAIs, Lifetime, Access Technology Type, Aggregated Handover Indication, APNs, GRE keys for downlink traffic, Charging Characteristics, Additional Parameters) message to PDN GW.

Mobile Node Network Access Identifiers (MN NAIs) identify UE1 and UE2 respectively.

APNs are default APNs for UE1 and UE2 respectively in target TWAN 102

GRE keys are used for GRE encapsulation of the PDN connections for UE1 and UE2 respectively In Step 4 of FIG. 9A-C, the PGW 112 initiates the IP-CAN Session Modification Procedure with the PCRF 114 to report the changes in IP-CAN type for both UE1 and UE2. Or, if the UE1 and UE2 have disconnected from the default PDN before handover, then the PGW 112 executes an aggregated PCEF initiated IP CAN Session Establishment Procedure.

In Step 5 of FIG. 9A-C, the PGW 112 informs the 3GPP AAA server 118 of its identity and the APNs corresponding to the UE1 and UE2's PDN connections.

In Step 6 of FIG. 9A-C, the PGW 112 returns an aggregated Proxy Binding Ack message to the target TWAN 102, including the IP addresses allocated for UE1 and UE2 respectively.

In Step 7 of FIG. 9A-C, the PMIPv6 tunnels are set up between the target TWAN 102 and the PGW 112 for UE1 and UE2 respectively at interface S2a.

In Step 8 of FIG. 9A-C, the target TWAN 102 informs the 3GPP AAA server 118 of the result of the tunnel setup, including APNs (for UE1 and UE2), TWAG 124 User Plane MAC address (same for UE1 and UE2), accepted PDN Type, PDN Addresses (for UE1 and UE2) and Additional Parameters received from the PGW 112. The 3GPP AAA server 118 confirms if the requested connectivity type (i.e. EPC 106 access with a requested APNs for UE1 and UE2) is accepted by the 3GPP AAA server 118. Then target TWAN 102 sends EAP success to the UE1 and UE2 respectively to complete EAP authentication.

In Step 9 of FIG. 9A-C, in transparent single-connection mode, the UE1 and UE2 may send layer 3 attach request. The UE1 and UE2 may send IPv6 Router Solicitation at any time after step 8. The target TWAN 102 may also send unsolicited IP layer configuration signalling, e.g. Router Advertisement (RA), over the point-to-point link towards the UE after step 8.

In Step 10 of FIG. 9A-C, in transparent single connection mode and in multi-connection mode, Router Advertisement with IPv6 prefix is sent to UE1 and UE2 respectively. The UE may perform additional IP layer configuration with the target TWAN 102 0 0.

In Step 11 of FIG. 9A-C, in multi-connection mode, UE1 and UE2 may initiate PDN connectivity request procedure in target TWAN 102 on S2a interface to establish PDN connections.

In Step 12 of FIG. 9A-C, the PGW 112 initiates resource allocation deactivation procedure to release 3GPP EPS bearers for both UE1 and UE2.

It is understood that the entities performing the steps illustrated in FIG. 9A-C are logical entities that may be implemented in the form of software (i.e., computer-executable instructions) stored in a memory of, and executing on a processor of, a network node or computer system such as those illustrated in FIG. 14C or FIG. 14D. That is, the method(s) illustrated in FIG. 9A-C may be implemented in the form of software (i.e., computer-executable instructions) stored in a memory of a network node, such as the node or computer system illustrated in FIG. 14C or FIG. 14D, which computer executable instructions, when executed by a processor of the node, perform the steps illustrated in FIG. 9A-C. It is also understood that any transmitting and receiving steps illustrated in FIG. 9A-C may be performed by communication circuitry of the node under control of the processor of the node and the computer-executable instructions (e.g., software) that it executes.

Aggregated Seamless Handover

As illustrated in Use Case I, II and III, many devices (e.g. devices for health or security monitoring) needing continuous communication require seamless handover (i.e. seamless handover) at a train station.

We propose aggregated seamless handover schemes using the architecture shown in FIG. 2 via the interface between (H)eNB 202 and TWAN 102. The direct interface may be implemented with wireless backhaul connection, such as satellite or 5G's GHz technology.

We use Use Case I and/or Use Case II as an example to explain the aggregated seamless handover schemes.

Aggregated Seamless Handover Initiated by UE from WLAN 103 to (H)eNB 202

Figure 6:
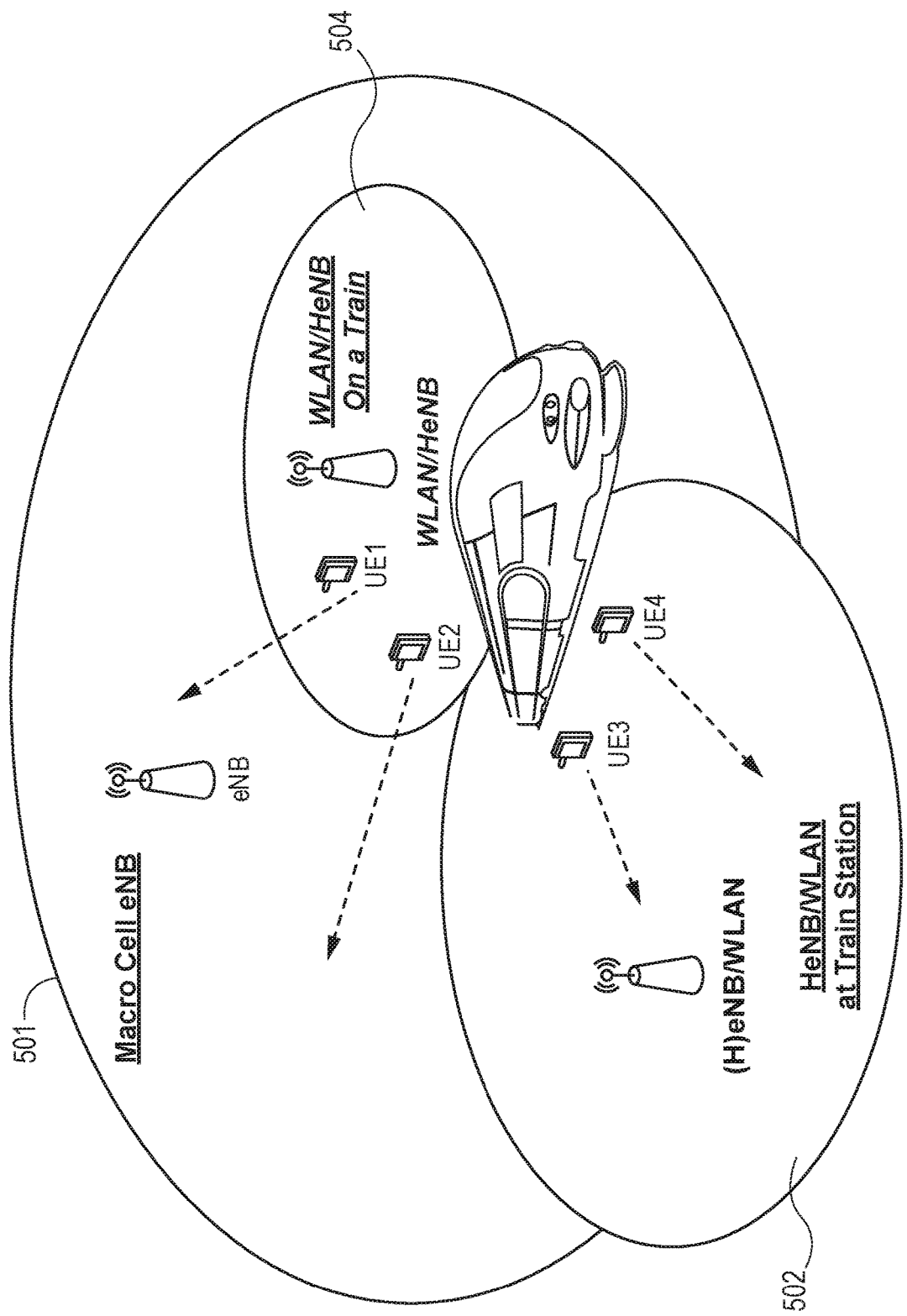
FIG. 6 is a diagram of Use Case II (Handover to a Targeted (H)eNB/WLAN at the Same Time).

As illustrated in Use Case I and Use Case II, there are many UEs requesting a seamless HO while they move from the source WLAN 103 at a train station to the target (H)eNB 202 on a train (i.e. Use Case I in FIG. 5), or move from the source WLAN 103 on a train to the target (H)eNB 202 at a train station (i.e. Use Case II in FIG. 6).

Figure 10B:
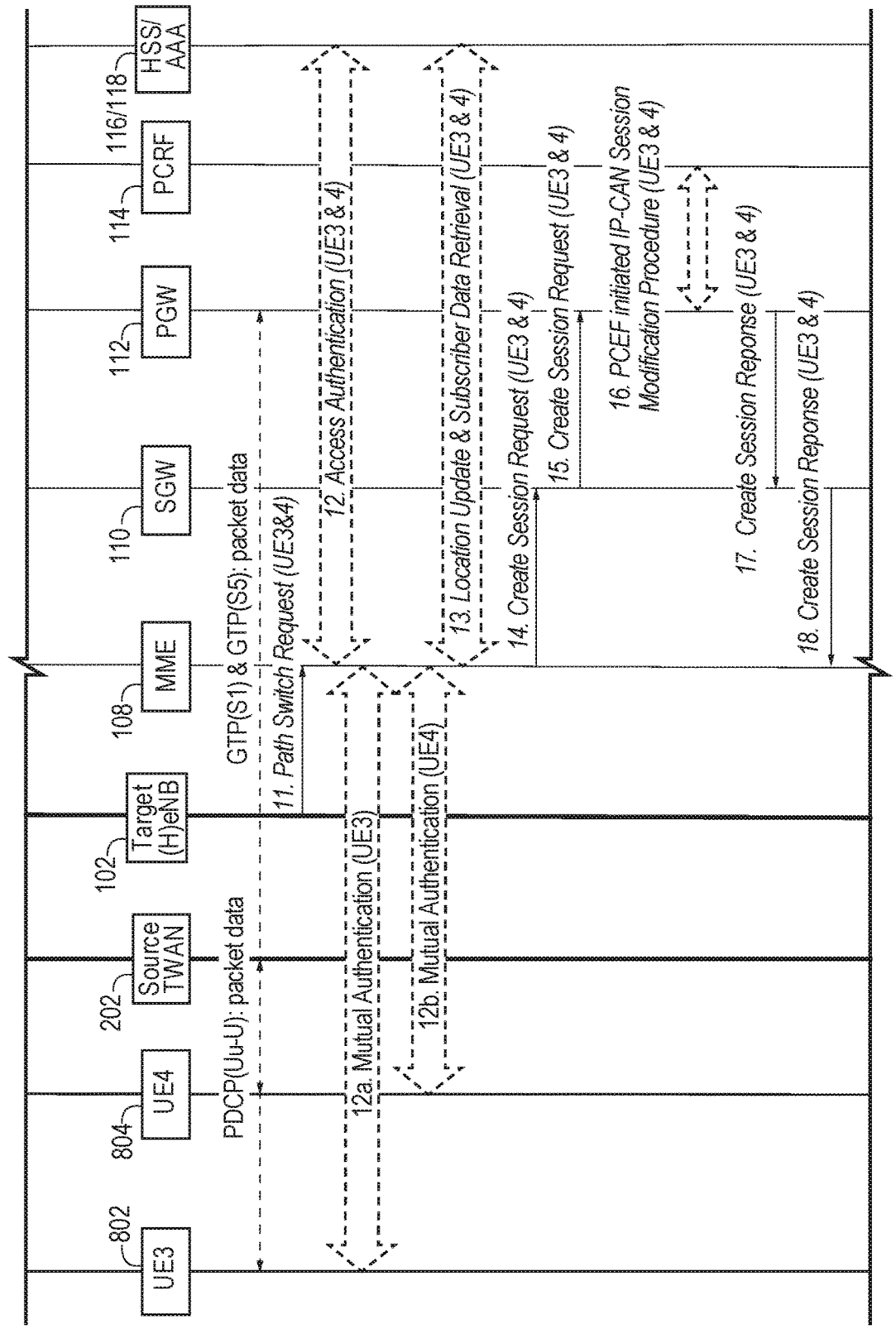
Figure 10C:
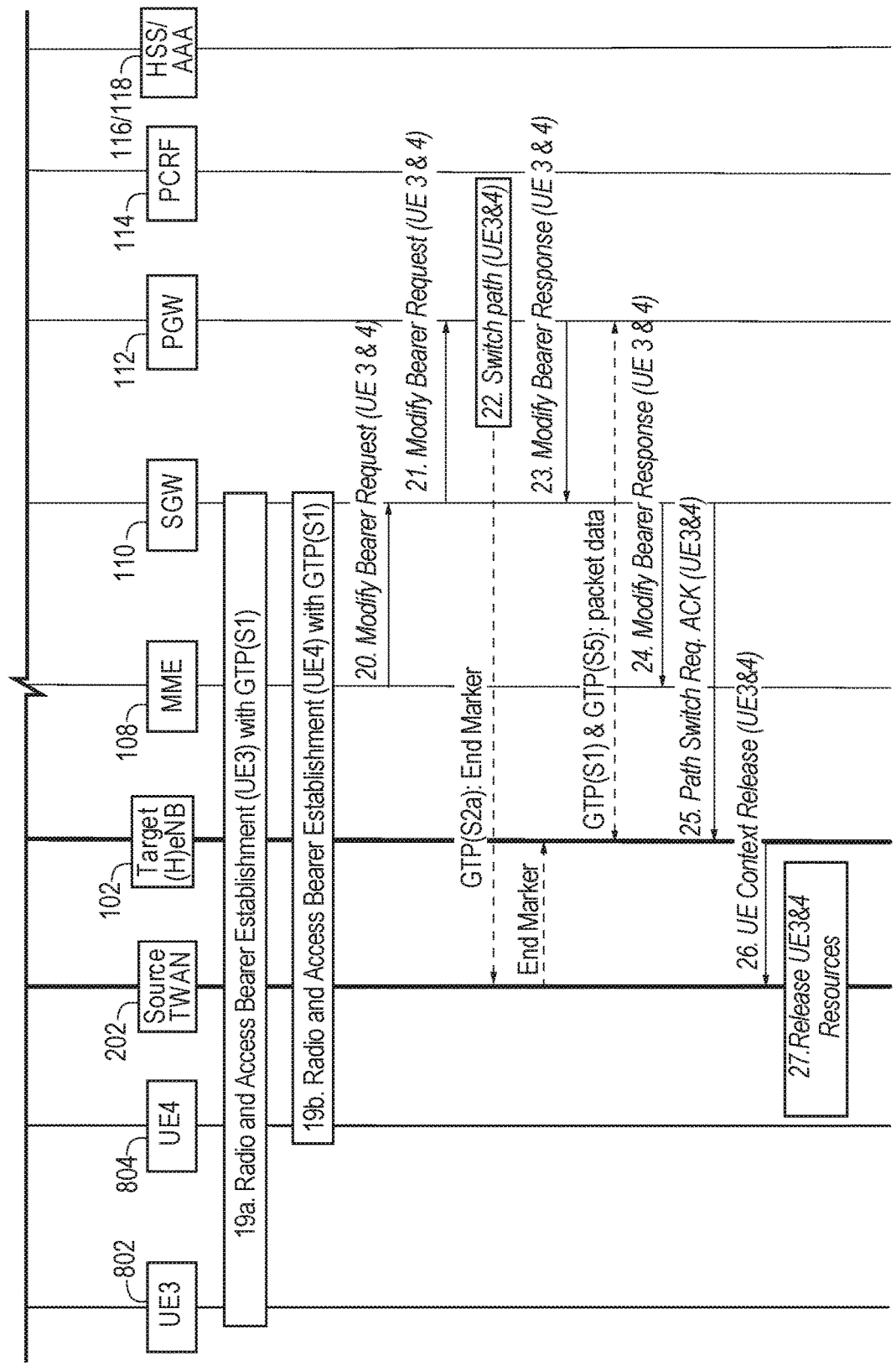

The UE initiated seamless HO procedure may include the following steps, as shown by the call flow in FIG. 10A-C.

In Step 0 of FIG. 10A-C, UE3 802 and UE4 804 have conducted Non-3GPP Access Authentication with AAA server 118 via STa interface, attachment/association with EPC 106 elements, as well as bearer(s) and tunnel(s) establishment for data between the source TWAN 102 at the train station or on the train and the PGW 112 of EPC 106 core network with PMIPv6 or GTP tunnel on S2a interface. Also Source TWAN 102 and Target (H)eNB 202 have established connection via the direct interface between them.

In Step 1 of FIG. 10A-C, UE3 802 and UE4 804 detect the target (H)eNB 202 decide to conduct seamless handover based on the detected and measured results with Aggregated & Seamless Handover Indication.

In Step 2 of FIG. 10A-C, UE3 802 and UE4 804 send an HO REQUEST message to source TWAN 102 with the detected information such as cell ID and measured information such as RSSI, CQI etc., related to the target (H)eNB 202, as well as Aggregated & Seamless Handover Indication and the UE context associated with HO.

In Step 3 of FIG. 10A-C, source TWAN 102 sends a HANDOVER REQUEST message to the target (H)eNB 202 with necessary HO information, i.e. Aggregated & Seamless Handover Indication and UE Context (UE3 802 & UE4 804)—security context and radio bearer (RB) context as well as the target (H)eNB 202 information as reported, to target (H)eNB 202 to proceed further in continuing the UE initiated HO procedure.

In Step 4 of FIG. 10A-C, target (H)eNB 202 performs Aggregated HO Admission Control based on the received Aggregated & Seamless Handover Indication and UE3 802 and UE4 804 Context and RB Context as well as the E-RAB QoS information to increase the likelihood of a successful HO. The target (H)eNB 202 configures the required resources according to the received E-RAB QoS information for both UE3 802 and UE4 804.

In Step 5 of FIG. 10A-C, target (H)eNB 202 prepares Aggregated HO with L1/L2 and sends the Handover Request Acknowledge to the source TWAN 102. The Handover Request Acknowledge message includes a transparent container to be sent to UE3 802 and UE4 804 individually as an RRC message from (H)eNB 202 to perform the handover.

In Step 6 of FIG. 10A-C, source TWAN 102 commands the UE3 802 and UE4 804 to perform the HO with the Radio Connection Reconfiguration message with necessary parameters (i.e. new C-RNTI, target HeNB security algorithm identifiers, and optionally dedicated random-access channel (RACH) preamble, target HeNB SIBs, etc.). It may also include RNL/TNL information for the forwarding tunnels, if necessary.

In Step 7 of FIG. 10A-C, source TWAN 102 sends the SN STATUS TRANSFER message to the target (H)eNB 202 to convey the uplink and downlink PDCP SN and HFN of RBs for both UE3 802 and UE4 804 for seamless handover.

In Step 8 of FIG. 10A-C, source TWAN 102 forwards UE3 802 and UE4 804's downlink data to target (H)eNB 202 for all UE3 802 and UE4 804's data bearers which are being established in the target (H)eNB 202 during the HO Request message processing.

In Step 9 of FIG. 10A-C, after receiving the Radio Connection Reconfiguration message (including the mobilityControlInformation) UE3 802 and UE4 804 may perform Disassociation with the source TWAN 102 to release the link with source TWAN 102.

In Step 10 of FIG. 10A-C, UE3 802 and UE4 804 perform synchronisation to target (H)eNB 202 and accesses the target cell via RACH. UE3 802 and UE4 804 also derive target HeNB specific keys and configure the selected security algorithms to be used in the target cell. Target (H)eNB 202 responds to the UE3 802 and UE4 804 with Up Link (UL) allocations and timing advance. UE3 802 and UE4 804 send Radio Connection Reconfiguration Complete messages (C-RNTIs) to confirm the handover to the target (H)eNB 202 to indicate that the handover procedure is completed for the UEs. The target (H)eNB 202 verifies the C-RNTIs sent in the Radio Connection Reconfiguration Complete messages and then may start to send data to the UE3 802 and UE4 804.

In Step 11 of FIG. 10A-C, target (H)eNB 202 sends a PATH SWITCH message with Aggregated Handover Indication to MME 108 to inform that UE3 802 and UE4 804 have changed RAT.

In Step 12 of FIG. 10A-C, the MME 108 may contact the HSS 116 for Access Authentication for both UE3 802 and UE4 804 with aggregated Authentication Request (in the Access Authentication messages as shown in step 3 of the call flow in FIG. 7), MME 108 derives the keys for UE3 802 and UE4 804 based on the aggregated Authentication Answer (in the Access Authentication messages as shown in step 3 of the call flow in FIG. 7) from HSS 116, and then MME 108 may conduct mutual authentication with UE3 802 and UE4 804 as shown in step 3a and 3b respectively, of FIG. 7.

In Step 13 of FIG. 10A-C, after successful authentication with UE3 802 and UE4 804, the MME 108 may perform aggregated location update procedure and subscriber data retrieval from the HSS 116 for both UE3 802 and UE4 804. Since the Request Type is "Aggregated Handover", the PGW 112 identities of UE3 802 and UE4 804 conveyed to the MME 108 will be stored in PDN subscription context. The MME 108 receives information on the PDNs that UE3 802 and UE4 804 are connected to over the source TWAN 102 in the Subscriber Data obtained from the HSS 116.

In Step 14 of FIG. 10A-C, the MME 108 sends a Create Session Request message to the SGW 110, which includes IMSIs of UE3 802 and UE4 804, MME 108 Context ID, PGW 112 address (same PGW 112 for UE3 802 and UE4 804), Aggregated Handover Indication (request type is aggregated handover), and APNs of UE3 802 and UE4 804. Since the Request Type is "Aggregated Handover", an Aggregated Handover Indication information is included.

In Step 15 of FIG. 10A-C, the SGW 110 sends an aggregated Create Session Request (Aggregated Handover Indication) message to the PGW 112 via interface S5 for both UE3 802 and UE4 804. Since Aggregated Handover Indication is included, the PGW 112 would not switch the tunnel from source TWAN 102 IP access to (H)eNB 202 at this point.

In Step 16 of FIG. 10A-C, since Handover Indication is included, the PGW 112 may execute an aggregated PCEF-Initiated IP CAN Session Modification Procedure with the PCRF 114 to report the changes in IP-CAN type for both UE3 802 and UE4 804. Or, if the UE3 802 and UE4 804 have disconnected from the default PDN before handover, then the PGW 112 executes an aggregated PCEF initiated IP CAN Session Establishment Procedure.

In Step 17 of FIG. 10A-C, the PGW 112 responds with an aggregated Create Session Response message to the SGW 110 via interface S5, which contains the IP addresses or the prefixes that were assigned to UE3 802 and UE4 804 while they were connected to the source TWAN 102, as well as the Charging IDs previously assigned to UE3 802 and UE4 804's PDN connections (i.e. default and dedicated bearers) in the TWAN 102.

In Step 18 of FIG. 10A-C, the SGW 110 returns an aggregated Create Session Response message to the MME 108, which includes the IP addresses of UE3 802 and UE4 804. This message also serves as an indication to the MME 108 that the S5 bearer setup and update for both UE3 802 and UE4 804 has been successful. At this step the PMIPv6 or GTP tunnel(s) over S5 are established.

In Step 19 of FIG. 10A-C, Radio and Access bearers are established for UE3 802 or UE4 804 at this step via the target (H)eNB 202 with GTP (S1) to SGW 110.

In Step 20 of FIG. 10A-C, the MME 108 sends an aggregated Modify Bearer Request message for both UE3 802 and UE4 804 to the SGW 110, which includes (H)eNodeB address and TEIDs for UE3 802 and UE4 804, and Handover Indication.

In Step 21 of FIG. 10A-C, since the Aggregated Handover Indication is included, the SGW 110 sends an aggregated Modify Bearer Request message to the PGW 112 via interface S5—to prompt the PGW 112 to tunnel packets from source WLAN to target (H)eNB 202 for both UE3 802 and UE4 804 and immediately to start routing packets to the SGW 110 for the default and any dedicated EPS bearers established for both UE3 802 and UE4 804.

In Step 22 of FIG. 10A-C, PGW 112 switches the downlink data path to the target (H)eNB 202 for both UE3 802 and UE4 804, i.e. new GTPs at S5 interface. The PGW 112 sends "End Marker" packets on the old paths to the source TWAN 102 and then can release any U-plane/TNL resources towards the source TWAN 102, e.g. the GTP tunnels for UE3 802 and UE4 804 at S2a interface In Step 23 of FIG. 10A-C, the PGW 112 acknowledges by sending aggregated Modify Bearer Response to the SGW 110 via interface S5. Now the packet data may be exchanged between (H)eNB 202 and PGW 112 via GTP (S1) and GTP (S5) for both UE3 802 and UE4 804.

For connectivity to multiple PDNs, UE3 802 or UE4 804 may establish connectivity to each PDN that is being transferred from source TWAN 102, besides the PDN connection established in above steps, by executing the UE requested PDN connectivity procedure herein.

In Step 24 of FIG. 10A-C, the SGW 110 acknowledges by sending aggregated Modify Bearer Response message to the MME 108 with the EPS Bearer Identities for both UE3 802 and UE4 804.

In Step 25 of FIG. 10A-C, MME 108 confirms the Path Switch message with the Path Switch Acknowledge message to target (H)eNB 202 for both UE3 802 and UE4 804.

In Step 26 of FIG. 10A-C, after the Path Switch Acknowledge message is received from the MME 108, the target (H)eNB 202 informs success of HO to source TWAN 102 by UE Context Release message which triggers the release of UE3 802 and UE4 804 resources by the source TWAN 102.

In Step 27 of FIG. 10A-C, TWAN 102 can release radio and C-plane related resources associated to UE3 802 and UE4 804 context upon reception of the UE Context Release message. But any ongoing data forwarding for UE3 802 and UE4 804 may continue.

Figure 11A:
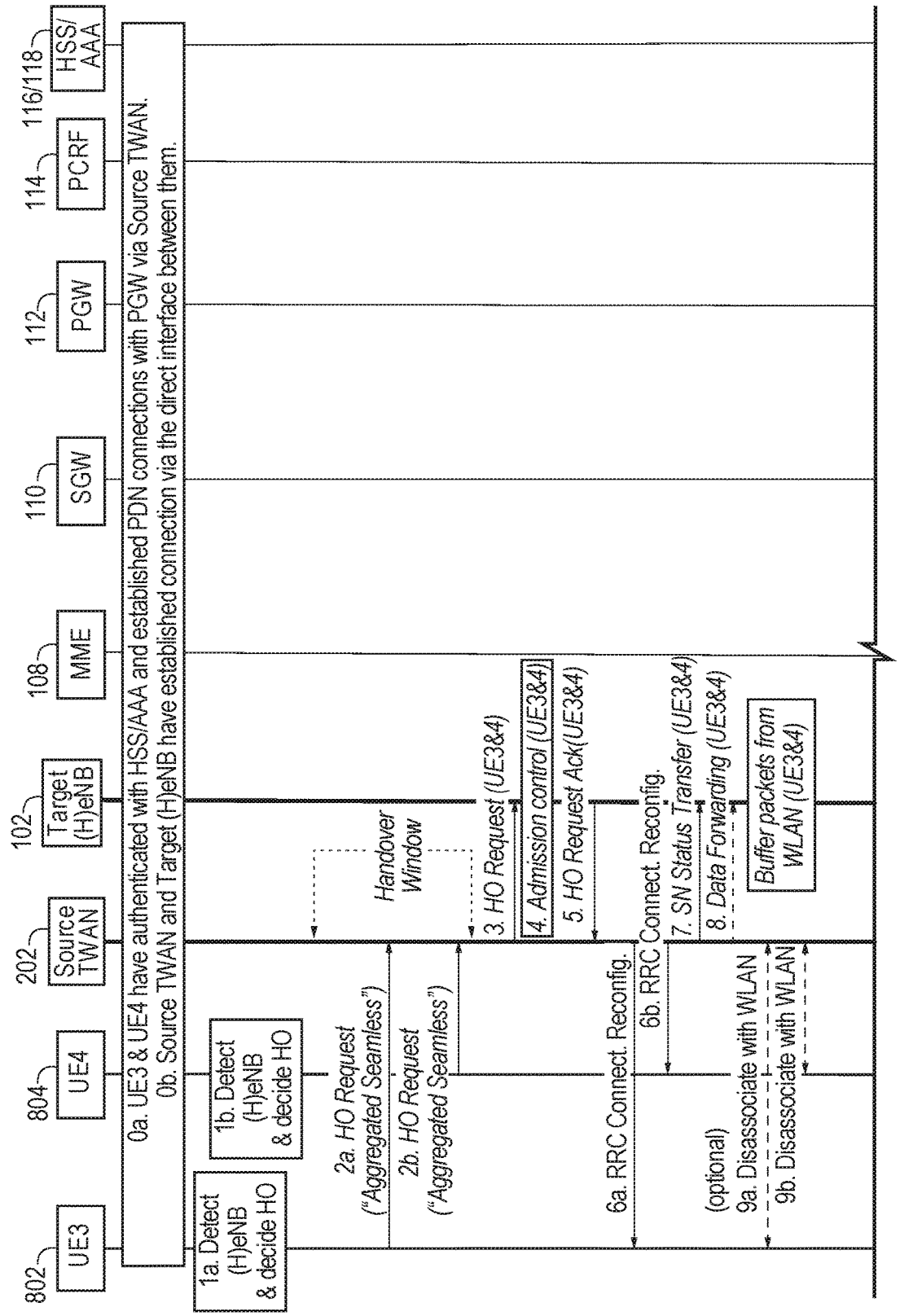
FIG. 11A-C is a diagram of an Aggregated Seamless HO Initiated by UE from WLAN to (H)eNB—Using Attach.
Figure 11B:
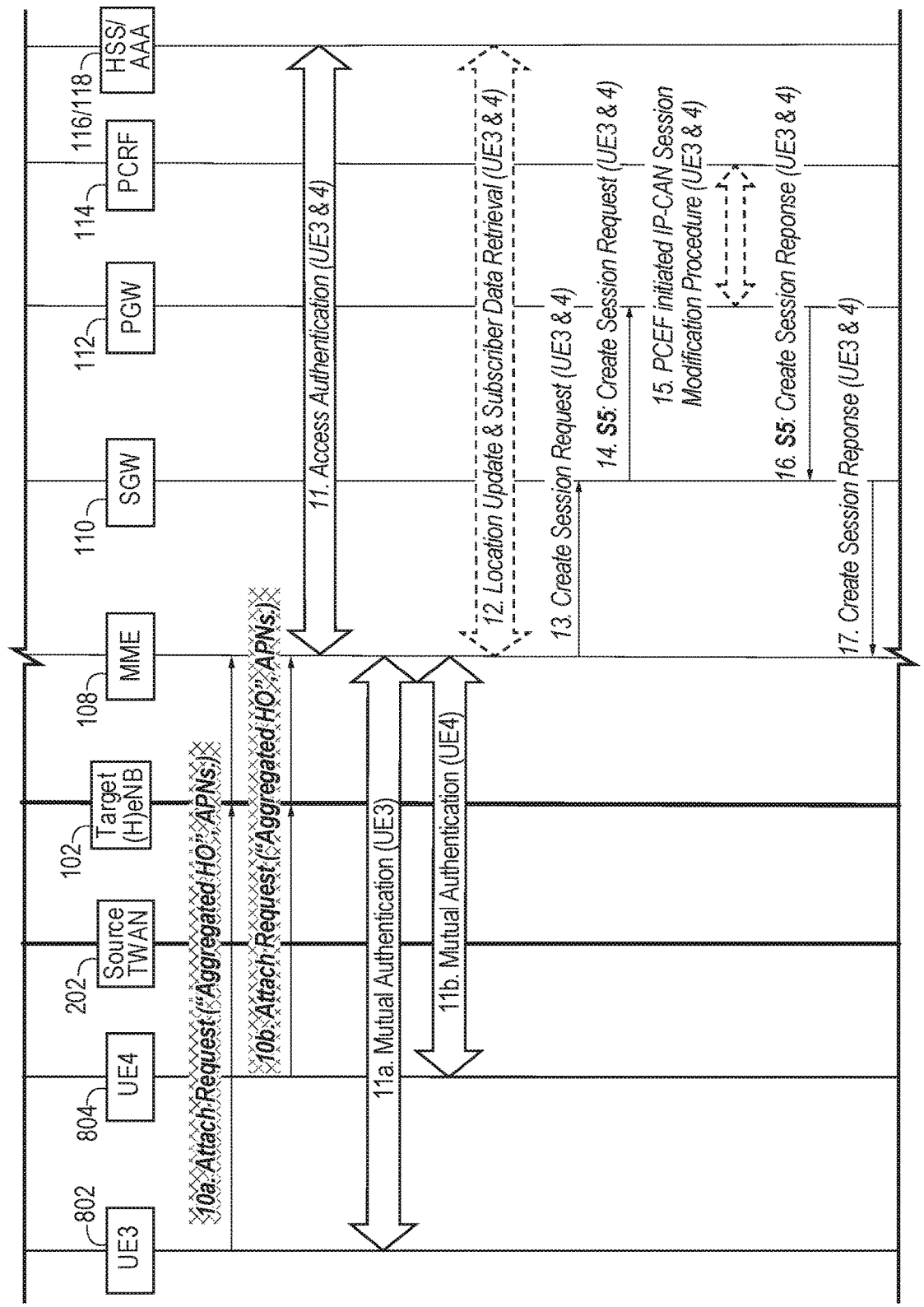
Figure 11C:
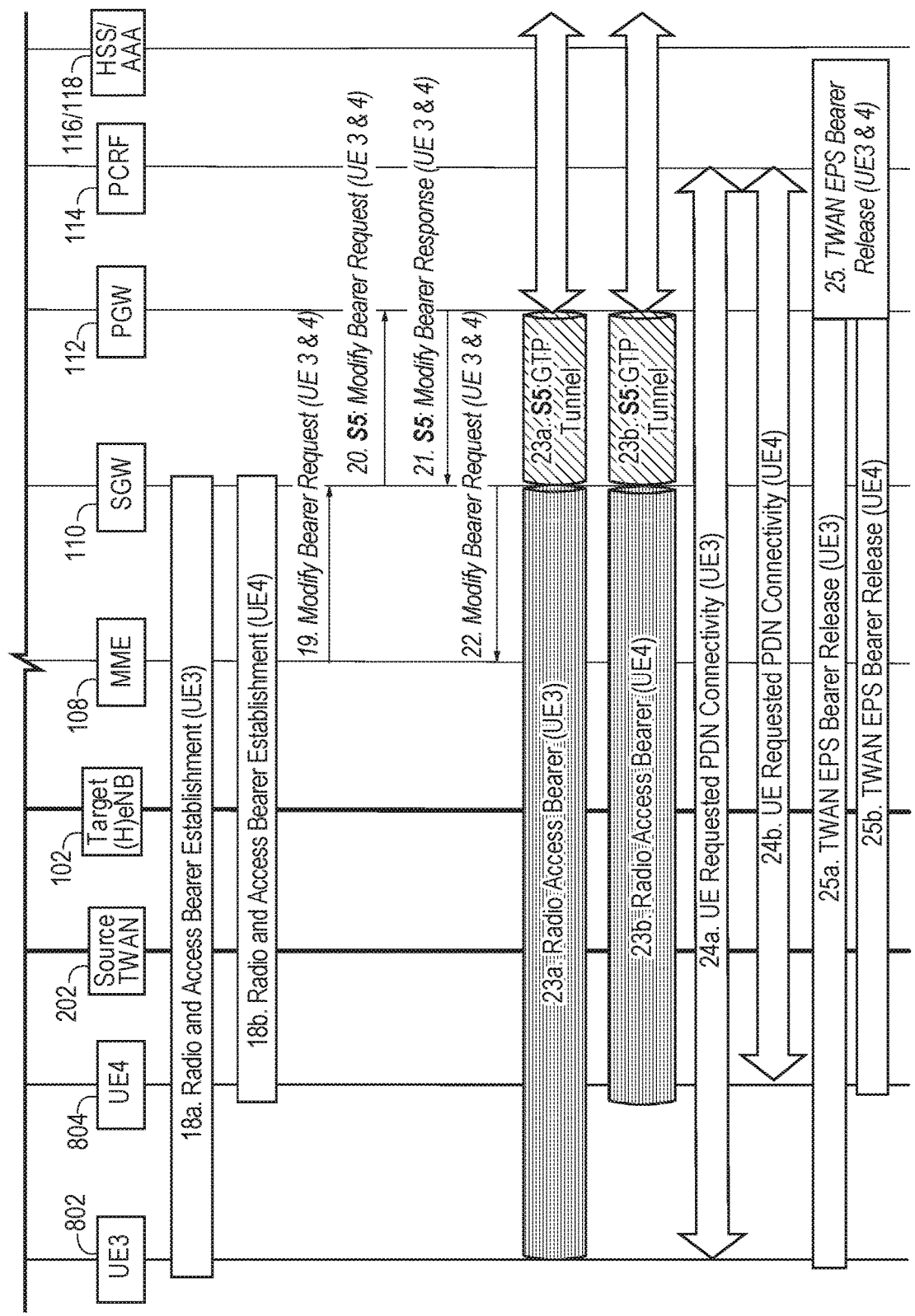
Figure 12A:
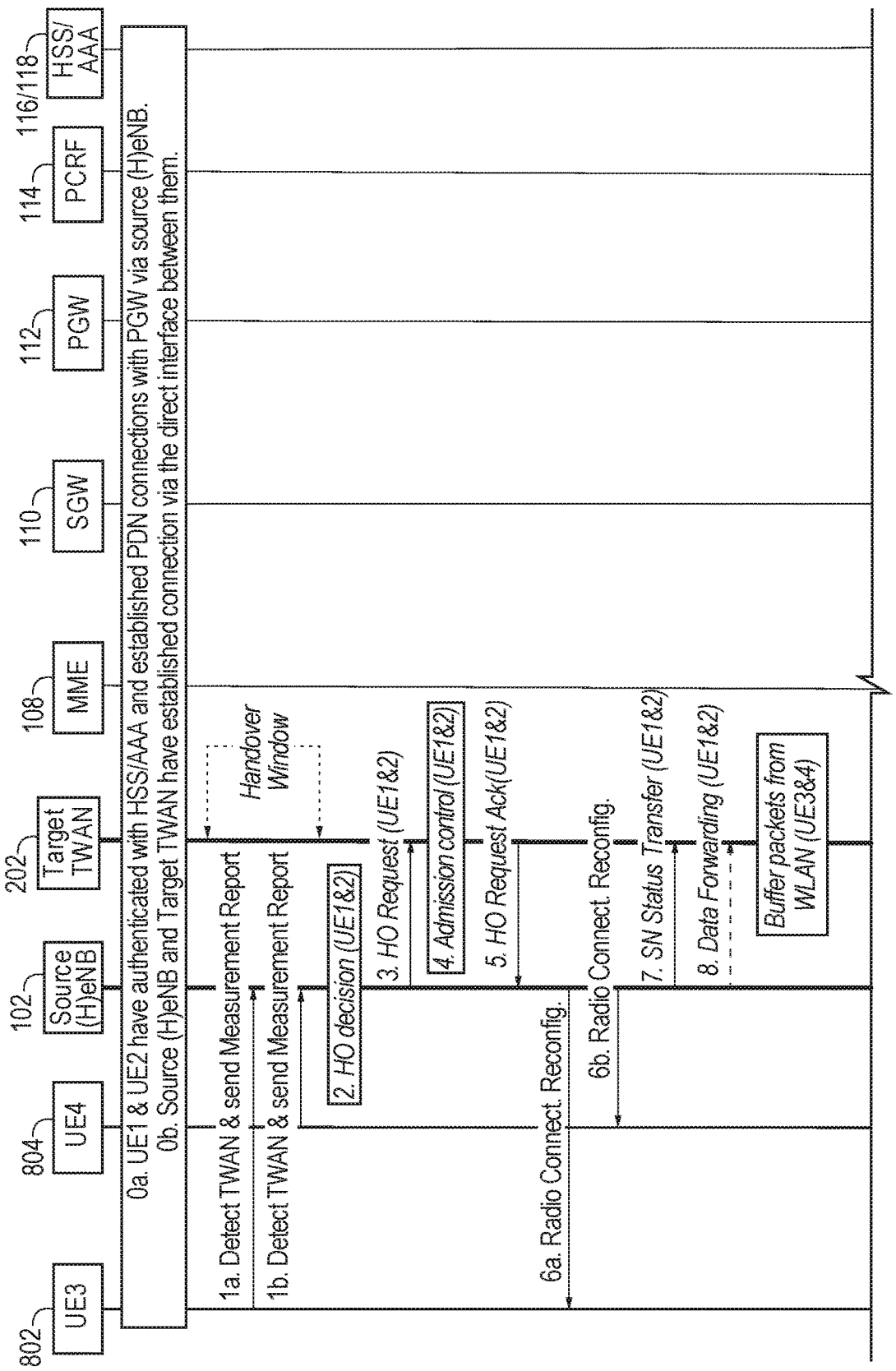
FIG. 12A-D is a diagram of an Aggregated Seamless HO Initiated by (H)eNB from (H)eNB to WLAN.
Figure 12B:
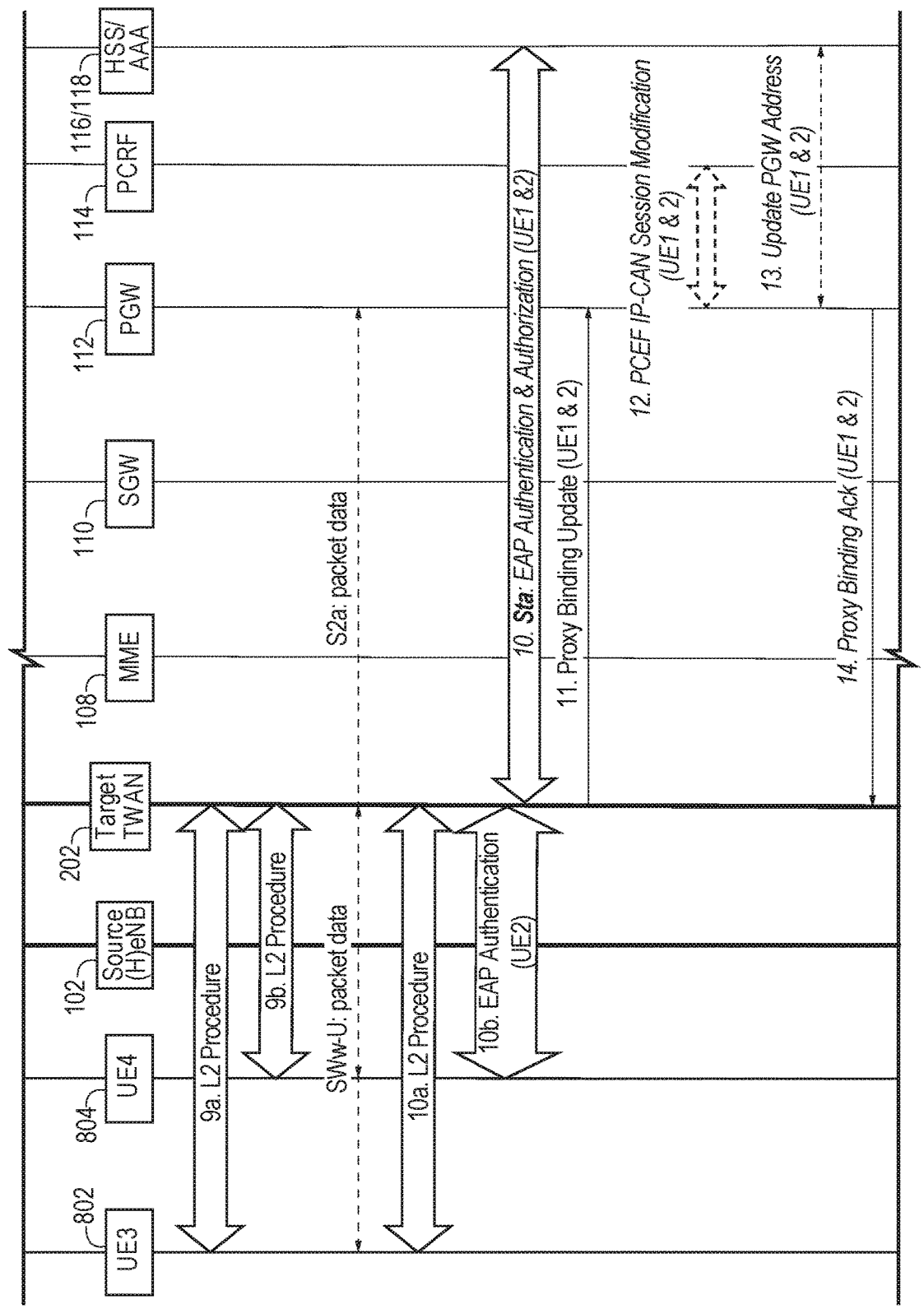
Figure 12C:
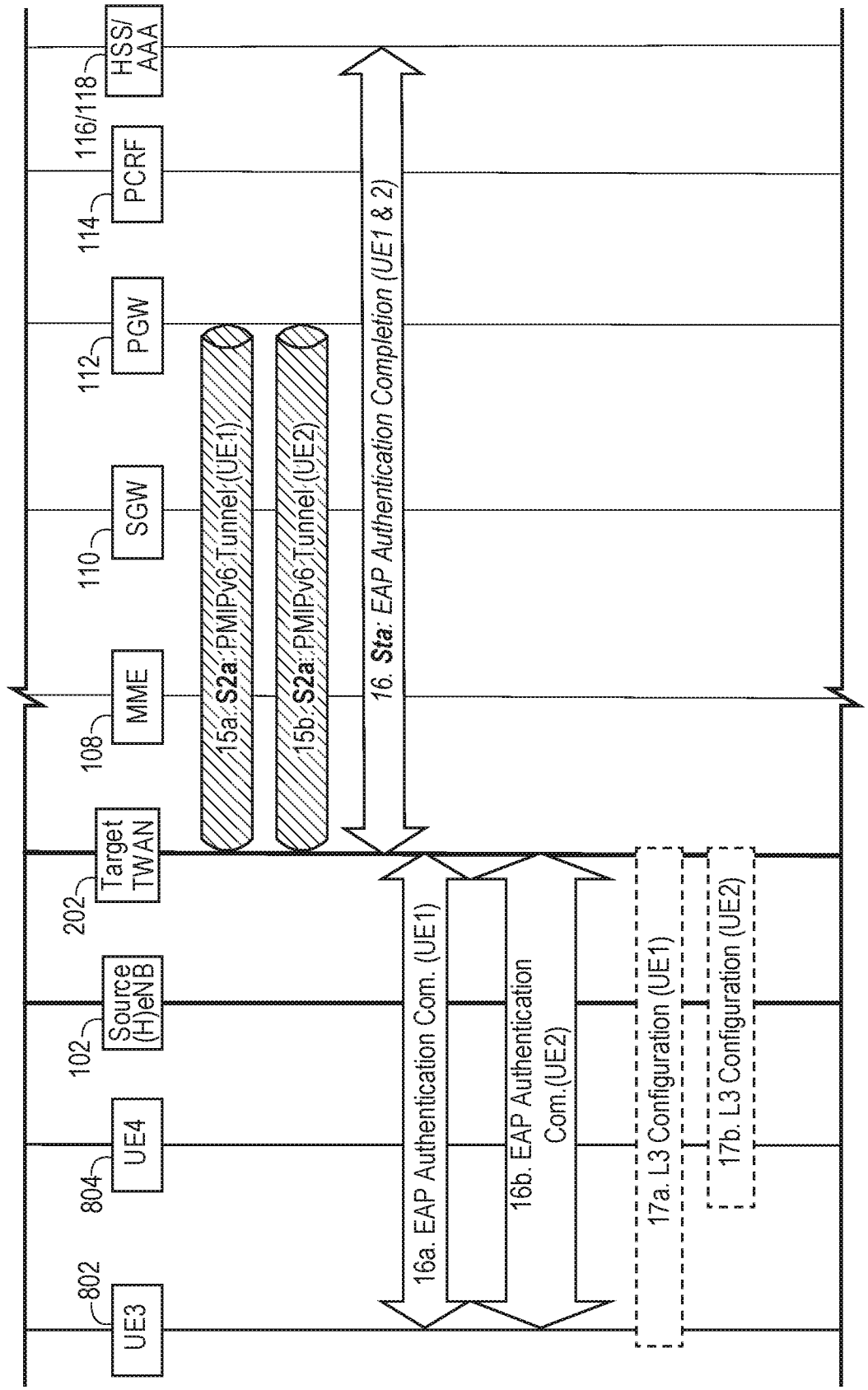
Figure 12D:
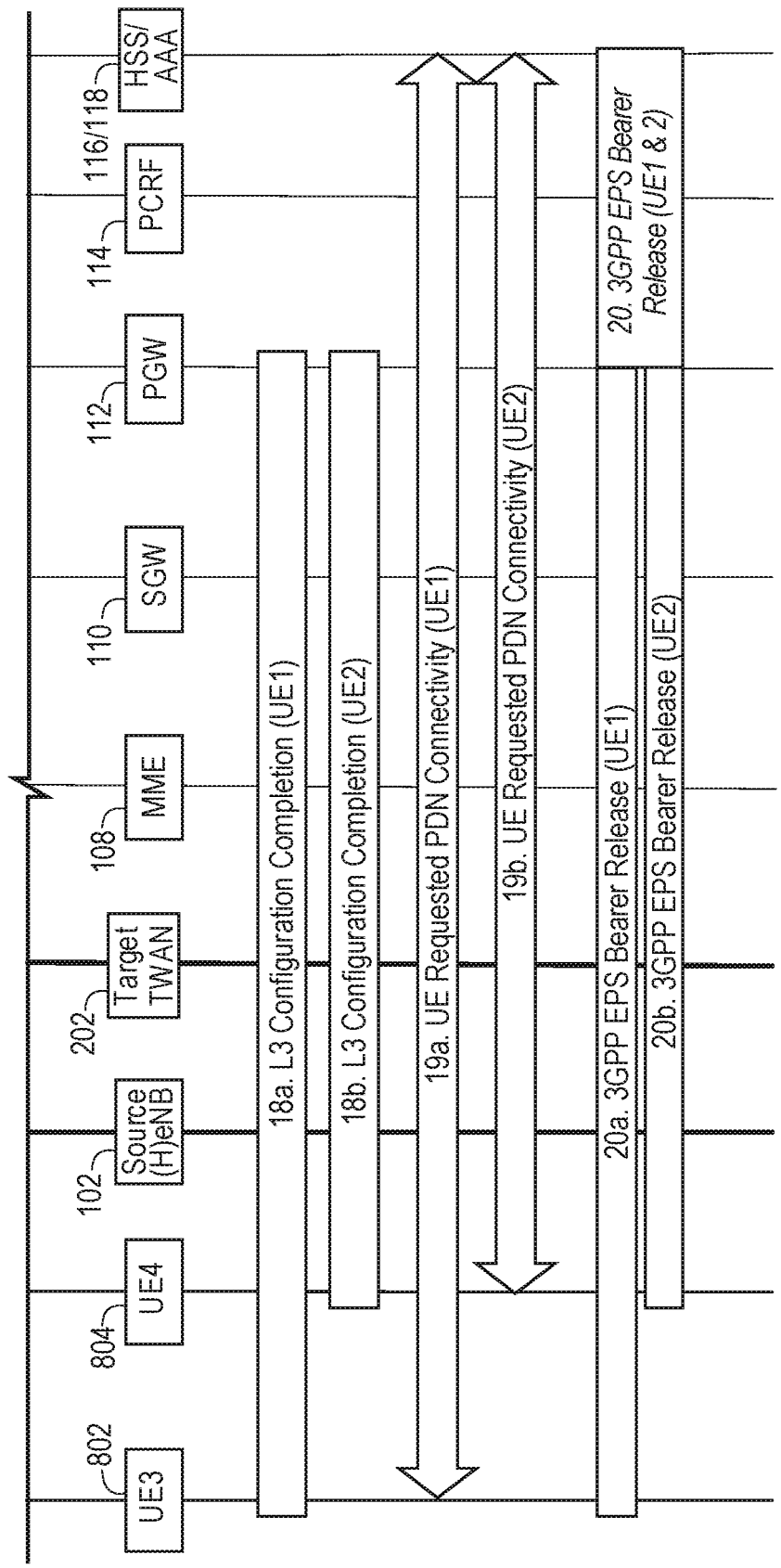

Another approach, using Attach with "handover" indication at step 10a and 10b, is illustrated in FIG. 11A-C.

It is understood that the entities performing the steps illustrated in FIGS. 10 and 11 are logical entities that may be implemented in the form of software (i.e., computer-executable instructions) stored in a memory of, and executing on a processor of, a network node or computer system such as those illustrated in FIG. 14C or FIG. 14D. That is, the method(s) illustrated in FIGS. 10 and 11 may be implemented in the form of software (i.e., computer-executable instructions) stored in a memory of a network node, such as the node or computer system illustrated in FIG. 14C or FIG. 14D, which computer executable instructions, when executed by a processor of the node, perform the steps illustrated in FIGS. 10 and 11. It is also understood that any transmitting and receiving steps illustrated in FIGS. 10 and 11 may be performed by communication circuitry of the node under control of the processor of the node and the computer-executable instructions (e.g., software) that it executes.

Aggregated Seamless Handover Initiated by (H)eNB 202 from (H)eNB 202 to WLAN 103

For Use Case II shown in FIG. 6 the (H)eNB 202 at a train may initiate an aggregated seamless handover for all the UEs disembarking from the train.

The source (H)eNB 202 initiated seamless HO procedure may include the following steps, which are also shown in the call flow in FIG. 12A-D.

In Step 0 of FIG. 12A-D, UE1 and UE2 are already connected with active PDN connections to different APNs over multiple accesses via the macro cell Source eNB or small cell HeNB covering the train station. The PDN connections have PMIPv6 or GTP tunnels on the S5 interface. Also Source (H)eNB 202 and Target TWAN 102 have established connection via the direct interface between them.

In Step 1 of FIG. 12A-D, UE1 and UE2 detect the target TWAN 102 and send measurements to source (H)eNB 202 with "Aggregated Seamless HO".

In Step 2 of FIG. 12A-D, source (H)eNB 202 decides to conduct seamless handover based on the detected and measured results collected from UE1 and UE2 with a time window (i.e. Handover Window).

In Step 3 of FIG. 12A-D, source (H)eNB 202 sends an Aggregated Seamless HANDOVER REQUEST message to the target TWAN 102 with necessary HO information, i.e. Aggregated & Seamless Handover Indication and UE Context (UE1 & UE2)—security context and radio bearer (RB) context as well as the target TWAN 102 information as reported, to target TWAN 102 to proceed the (H)eNB 202 initiated HO procedure.

In Step 4 of FIG. 12A-D, target TWAN 102 performs HO Admission Control based on the received UE1 and UE2 Context and Radio Bearer Context as well as the QoS information to increase the likelihood of a successful HO. The target TWAN 102 configures the required resources according to the received QoS information for both UE1 and UE2.

In Step 5 of FIG. 12A-D, target TWAN 102 prepares HO with L1/L2 and sends the HANDOVER REQUEST ACKNOWLEDGE to the source (H)eNB 202. The HANDOVER REQUEST ACKNOWLEDGE message includes information to be sent to UE1 and UE2 individually as a Radio Connection Reconfiguration message from HeNB to perform the handover.

In Step 6 of FIG. 12A-D, source (H)eNB 202 commands the UE1 and UE2 to perform the HO with the Radio Connection Reconfig. message with necessary parameters (i.e. new radio network ID, target TWAN 102 security algorithm identifiers, etc.).

In Step 7 of FIG. 12A-D, source (H)eNB 202 sends the SN STATUS TRANSFER message to the target TWAN 102 to convey the uplink and downlink Sequence Number and Frame Number etc. for both UE1 and UE2.

In Step 8 of FIG. 12A-D, source (H)eNB 202 forwards UE1 and UE2's downlink data to target TWAN 102 for all UE1 and UE2's data bearers which are being established in the target TWAN 102 during the HO REQUEST message processing. The target (H)eNB 202 buffers UE1 and UE2'd data.

In Step 9 of FIG. 12A-D, UE1 and UE2 perform L2 procedures such as association with target TWAN 102 accordingly.

Steps 10-20 of FIG. 12A-D are the same as steps 2-12 described with respect to Aggregated Seamless Handover Initiated by UE from WLAN 103 to (H)eNB 202 in FIG. 10A-C.

It is understood that the entities performing the steps illustrated in FIG. 12A-D are logical entities that may be implemented in the form of software (i.e., computer-executable instructions) stored in a memory of, and executing on a processor of, a network node or computer system such as those illustrated in FIG. 14C or FIG. 14D. That is, the method(s) illustrated in FIG. 12A-D may be implemented in the form of software (i.e., computer-executable instructions) stored in a memory of a network node, such as the node or computer system illustrated in FIG. 14C or FIG. 14D, which computer executable instructions, when executed by a processor of the node, perform the steps illustrated in FIG. 12A-D. It is also understood that any transmitting and receiving steps illustrated in FIG. 12A-D may be performed by communication circuitry of the node under control of the processor of the node and the computer-executable instructions (e.g., software) that it executes.

Aggregated Handover Indication

In the call flows above, it is described how a UE can include an "Aggregated Handover" indication in a message to the TWAN 102, MME 108, or AAA server 118. This indication can include multiple fields, such as those listed in Table 2-1.

TABLE 2-1

Aggregated Handover Information from the UE

| Field Name | Description |
| --- | --- |
| Aggregated Handover Indication | An indication that the UE supports and is willing to take part in aggregated handover. |
| Aggregated Handover Delay Timer | This field gives the recipient (i.e. TWAN 102, MME 108, or AAA server 118) guidance as to how much extra delay can be tolerated by the UE while it waits for the recipient to receive requests from other UE's to aggregate. |
| External Group ID | The UE may provide its external group ID to the recipient (i.e. TWAN 102, MME 108, or AAA server 118) in order to indicate to the recipient that the UE's requests can be aggregated with other group members |
| External Group Size | The UE may provide the size of its group (in terms of number of UE's) to the recipient (i.e. TWAN 102, MME 108, or AAA server 118) in order to give the recipient some guidance to know how many requests should be aggregated before the procedure (i.e. attach or handover) should proceed. |

Figure 13:
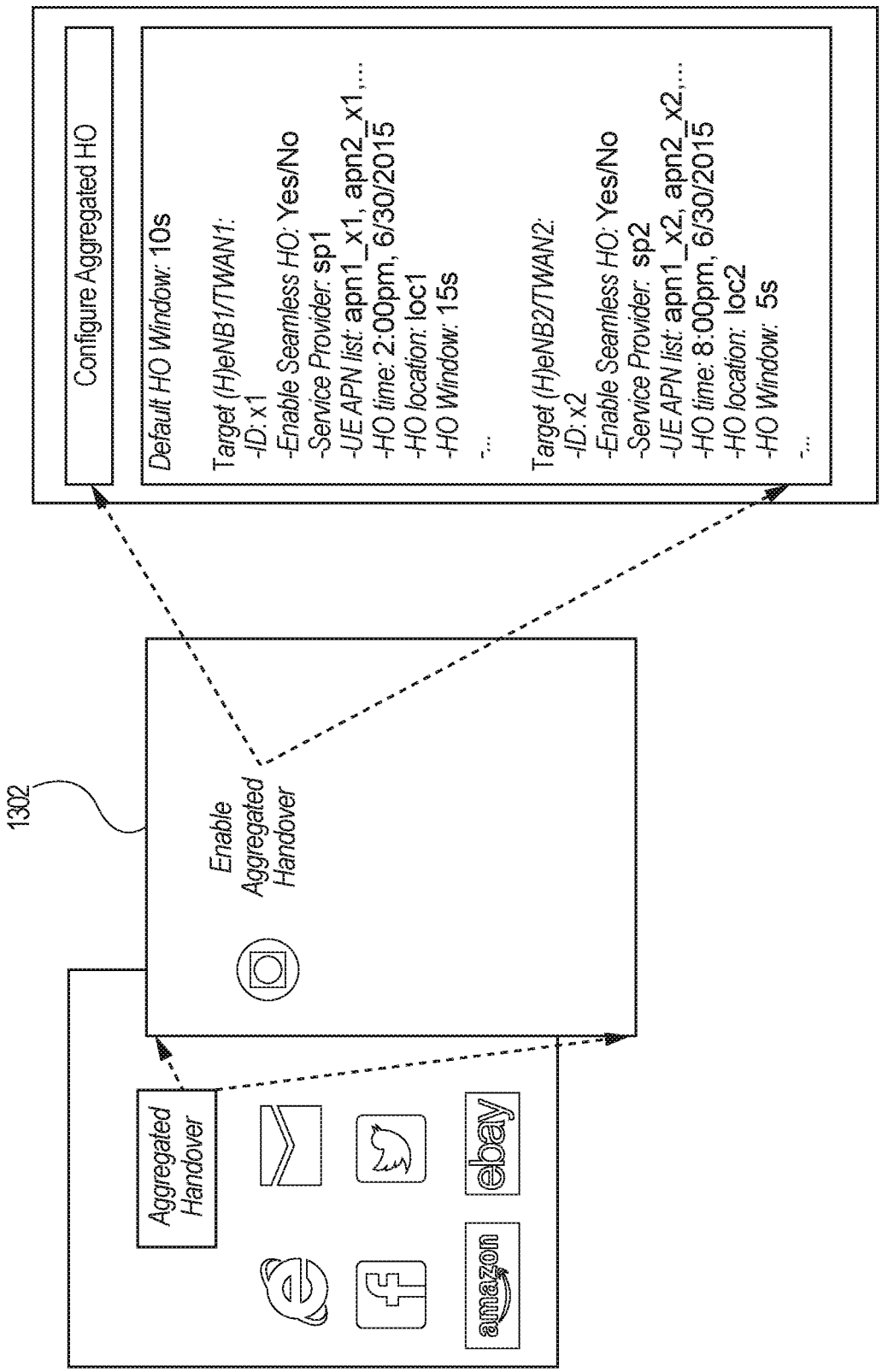
FIG. 13 is a diagram of a Graphical User Interface (GUI) of one embodiment.

Interfaces, such as Graphical User Interfaces (GUIs), can be used to assist user to control and/or configure functionalities related to the aggregated handover. FIG. 13 is a diagram that illustrates an interface 1302. As described previously, there are a few parameters that may be pre-configured by a user, such as the Handover Window, any of the parameters in Table 2-1, the target (H)eNB 202 or WLAN 103 for handover and the related time etc. GUI 1302 can allow a user to pre-configure such parameters. It is to be understood that interface 1302 can be produced using displays such as those shown in FIGS. 14C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 14A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as TWAN 102, TWAP 126, TWAG 124, WLAN 103, EPC 106, HSS 116 PGW 112 SGW 110, PCRF 114, 3GPP AAA Server 118, 3GGP LTE Access network 104, SeGW 122, (H)eNB 202, ISW GW 302, HeNB/WLAN 502, WLAN\HeNB 504, logical entities at UE 105, 107, 802, and 804 and logical entities to produce GUI 1302.

As shown in FIG. 14A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 14A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 14B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as TWAN 102, TWAP 126, TWAG 124, WLAN 103, EPC 106, HSS 116 PGW 112 SGW 110, PCRF 114, 3GPP AAA Server 118, 3GGP LTE Access network 104, SeGW 122, (H)eNB 202, ISW GW 302, HeNB/WLAN 502, WLAN\HeNB 504, logical entities at UE 105, 107, 802, and 804 and logical entities to produce GUI 1302. The M2M service layer 22 may be implemented by one or more servers, computers, devices, virtual machines (e.g. cloud/storage farms, etc.) or the like, including for example the devices illustrated in FIGS. 14C and 14D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 14B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as TWAN 102, TWAP 126, TWAG 124, WLAN 103, EPC 106, HSS 116 PGW 112 SGW 110, PCRF 114, 3GPP AAA Server 118, 3GGP LTE Access network 104, SeGW 122, (H)eNB 202, ISW GW 302, HeNB/WLAN 502, WLAN\HeNB 504, logical entities at UE 105, 107, 802, and 804 and logical entities to produce GUI 1302 may be hosted within a M2M service layer instance hosted by an M2M node, such as an M2M server, M2M gateway, or M2M device, as shown in FIG. 14B. For example, the logical entities such as TWAN 102, TWAP 126, TWAG 124, WLAN 103, EPC 106, HSS 116 PGW 112 SGW 110, PCRF 114, 3GPP AAA Server 118, 3GGP LTE Access network 104, SeGW 122, (H)eNB 202, ISW GW 302, HeNB/WLAN 502, WLAN\HeNB 504, logical entities at UE 105, 107, 802, and 804 and logical entities to produce GUI 1302 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 14C or FIG. 14D described below.

Further, logical entities such as TWAN 102, TWAP 126, TWAG 124, WLAN 103, EPC 106, HSS 116 PGW 112 SGW 110, PCRF 114, 3GPP AAA Server 118, 3GGP LTE Access network 104, SeGW 122, (H)eNB 202, ISW GW 302, HeNB/WLAN 502, WLAN\HeNB 504, logical entities at UE 105, 107, 802, and 804 and logical entities to produce GUI 1302 can implemented as part of an M2M network that uses a Service Oriented Architecture (SOA) and/or a Resource-Oriented Architecture (ROA) to access services of the present application.

FIG. 14C is a block diagram of an example hardware/software architecture of a M2M network node 30, such as an M2M device 18, an M2M gateway 14, an M2M server, or the like. The node 30 can execute or include logical entities such as TWAN 102, TWAP 126, TWAG 124, WLAN 103, EPC 106, HSS 116 PGW 112 SGW 110, PCRF 114, 3GPP AAA Server 118, 3GGP LTE Access network 104, SeGW 122, (H)eNB 202, ISW GW 302, HeNB/WLAN 502, WLAN\HeNB 504, logical entities at UE 105, 107, 802, and 804 and logical entities to produce GUI 1302. The device 30 can be part of an M2M network as shown in FIG. 14A-B or part of a non-M2M network. As shown in FIG. 14C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 14C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 14C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 14C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 14D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as TWAN 102, TWAP 126, TWAG 124, WLAN 103, EPC 106, HSS 116 PGW 112 SGW 110, PCRF 114, 3GPP AAA Server 118, 3GGP LTE Access network 104, SeGW 122, (H)eNB 202, ISW GW 302, HeNB/WLAN 502, WLAN\HeNB 504, logical entities at UE 105, 107, 802, and 804 and logical entities to produce GUI 1302. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 14A and FIG. 14B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 14A-B or the device 30 of FIG. 14C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as TWAN 102, TWAP 126, TWAG 124, WLAN 103, EPC 106, HSS 116 PGW 112 SGW 110, PCRF 114, 3GPP AAA Server 118, 3GGP LTE Access network 104, SeGW 122, (H)eNB 202, ISW GW 302, HeNB/WLAN 502, WLAN\HeNB 504, logical entities at UE 105, 107, 802, and 804 and logical entities to produce GUI 1302 may be embodied in the form of the computer executable instructions stored on a computer-readable storage medium. Computer readable storage media include both volatile and nonvolatile, removable and non-removable media implemented in any non-transitory (i.e., tangible or physical)

method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor and a memory, the apparatus further comprising computer-executable instructions stored in the memory of the apparatus which, when executed by the processor of the apparatus, cause the apparatus to:
   receive a plurality of indications from a plurality of User Equipments (UEs) associated with a desired handover for the plurality of UEs between a first connection and a second connection, wherein the indications comprise handover window period values for the UEs; and
   initiate an aggregated handover for more than one of the plurality of UEs within one or more handover window periods of the more than one of the plurality of UEs.

2. The apparatus of claim 1 wherein the apparatus uses the handover window specified by each UE to decide a priority of grouping the UEs for aggregated handover.

3. The apparatus of claim 1, wherein the first connection corresponds to a non-cellular connection and the second connection corresponds to a cellular connection.

4. The apparatus of claim 3, wherein the first connection comprises a WiFi connection.

5. The apparatus of claim 4, wherein the apparatus comprises a Mobility Management Entity (MME) or a Network Function and the aggregate handover comprises a WiFi connection to cellular connection handover.

6. The apparatus of claim 1, wherein the aggregate handover is from the first connection to the second connection.

7. The apparatus of claim 1, wherein the aggregate handover comprises a seamless handover that uses an interface between a first access point and a second access point for the aggregate handover.

8. The apparatus of claim 1, wherein the aggregated handover comprises a plurality of messages that combine information for the more than one of the plurality of UEs.

9. A user equipment (UE) comprising a processor and a memory, the UE further comprising computer-executable instructions stored in the memory of the UE which, when executed by the processor of the UE, cause the UE to:
   send an indication of a desired handover between a first connection and a second connection for the UE, wherein the indication comprises a handover window period value for the UE; and
   undergo an aggregated handover along with another UE within a handover window period.

10. The apparatus of claim 9, wherein the first connection corresponds to a non-cellular connection and the second connection corresponds to a cellular connection.

11. The apparatus of claim 10, wherein the first connection comprises a WiFi connection.

12. The UE of claim 10 wherein the indication is sent to a Mobility Management Entity (MME) or a Network Function and the aggregated handover is from the first connection to the second connection.

13. The UE of claim 9, wherein the aggregate handover comprises a seamless handover that uses an interface between a first access point and a second access point for the aggregate handover.

14. The UE of claim 9, wherein the aggregated handover comprises a plurality of messages that combine information for the UE and the another UE.

15. An apparatus comprising a processor and a memory, the apparatus further comprising computer-executable instructions stored in the memory of the apparatus which, when executed by the processor of the apparatus, cause the apparatus to:
   receive a plurality of indications from an access point that is connected to a plurality of User Equipments (UEs) requesting an aggregated handover for the plurality of UEs along with a handover window period, wherein the indications comprise handover window period values for the UEs; and
   initiate an aggregated handover for the plurality of UEs within the handover window period.

16. The apparatus of claim 15, wherein the indications are received from the access point as a result of an upcoming shut down of the access point.

17. The apparatus of claim 15, wherein the first connection corresponds to a non-cellular connection and the second connection corresponds to a cellular connection.

18. The apparatus of claim 17, wherein the first connection comprises a WiFi connection.

* * * * *